(12) United States Patent
Takahashi et al.

(10) Patent No.: US 8,619,522 B2
(45) Date of Patent: Dec. 31, 2013

(54) OPTICAL PICKUP AND OPTICAL READ/WRITE APPARATUS

(75) Inventors: Yuichi Takahashi, Nara (JP); Kazuo Momoo, Osaka (JP); Jun-ichi Asada, Hyogo (JP)

(73) Assignee: Panasonic Corporation, Osaka (JP)

( * ) Notice: Subject to any disclaimer, the term of this patent is extended or adjusted under 35 U.S.C. 154(b) by 24 days.

(21) Appl. No.: 13/535,633

(22) Filed: Jun. 28, 2012

(65) Prior Publication Data

US 2013/0077456 A1    Mar. 28, 2013

(30) Foreign Application Priority Data

Sep. 22, 2011  (JP) .................................. 2011-206939

(51) Int. Cl.
*G11B 7/00*  (2006.01)

(52) U.S. Cl.
USPC .................. 369/44.37; 369/44.38; 369/53.22; 369/112.03

(58) Field of Classification Search
USPC ............. 369/44.37, 44.38, 53.11–53.45, 100, 369/112.01, 112.03
See application file for complete search history.

(56) References Cited

U.S. PATENT DOCUMENTS

| | | | |
|---|---|---|---|
| 4,488,277 A * | 12/1984 | McFarlane et al. ......... | 369/47.28 |
| 4,494,226 A * | 1/1985 | Hazel et al. ................ | 369/44.26 |
| 4,935,913 A | 6/1990 | Shinoda | |
| 5,105,413 A * | 4/1992 | Bakx .......................... | 369/53.33 |
| 5,130,965 A * | 7/1992 | Karaki et al. ............... | 369/44.38 |
| 5,267,226 A * | 11/1993 | Matsuoka et al. ......... | 369/44.11 |
| 5,400,308 A * | 3/1995 | Sugaya et al. .................. | 369/15 |
| 5,450,390 A * | 9/1995 | Toda et al. ..................... | 369/121 |
| 5,475,665 A | 12/1995 | Tani et al. | |
| 5,719,839 A * | 2/1998 | Naito .......................... | 369/53.36 |
| 5,808,991 A * | 9/1998 | Inoue .......................... | 369/53.36 |
| 6,034,933 A * | 3/2000 | Rokutan ..................... | 369/53.27 |
| 2013/0051203 A1* | 2/2013 | Mahnad ..................... | 369/44.38 |
| 2013/0051205 A1* | 2/2013 | Asada et al. ............... | 369/47.51 |

FOREIGN PATENT DOCUMENTS

| | | |
|---|---|---|
| JP | 59-113509 A | 6/1984 |
| JP | 63-249941 A | 10/1988 |
| JP | 08-045078 A | 2/1996 |

\* cited by examiner

*Primary Examiner* — Brenda Bernardi

(74) *Attorney, Agent, or Firm* — Renner, Otto, Boisselle & Sklar, LLP

(57) ABSTRACT

In one embodiment, an optical pickup includes an optical system which forms multiple light beams based on the light emitted from a light source and which converges a write beam and a read beam, thereby forming a main spot and a sub-spot, respectively, on an optical storage medium. This optical system converges the write and read beams onto the optical storage medium so that the main spot moves through the same region on the optical storage medium ahead of the sub-spot. The optical pickup further includes a detector for sensing the write and read beams reflected from the storage medium. The detector includes a first photodiode 10 that receives the reflected light from the main spot 50R on the storage medium and a second photodiode 11 that receives a portion of the reflected light from the sub-spot 51R.

5 Claims, 22 Drawing Sheets

WRITE MODULATED COMPONENT

RECORDED MARK SIGNAL COMPONENT

Sm

Ss

DIFFERENTIAL SIGNAL

DRAW SIGNAL

WRITE MODULATED COMPONENT

RECORDED MARK SIGNAL COMPONENT

SsA

SsB

DIFFERENTIAL SIGNAL

DRAW SIGNAL

RECORDING TRACK
(LAND PORTION)

OPTICAL PICKUP AND OPTICAL READ/WRITE APPARATUS

BACKGROUND OF THE INVENTION

1. Field of the Invention

The present disclosure relates to an optical read/write apparatus that reads, writes or erases information from/on an optical storage medium such as an optical tape, an optical disc or an optical card. More particularly, the present disclosure relates to an apparatus that carries out verification on marks being recorded on an optical storage medium while writing information on it.

2. Description of the Related Art

Recently, the size of digital data that can be stored on a storage medium has been rising steeply year by year as the resolutions of video data and still picture data have been tremendously increased and as increasing numbers of paper media have been converted into electronic ones. Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated there should keep on skyrocketing from now on.

In the meantime, as regulations have been established one after another with regard to the duty of preserving such a huge amount of data saved, it should also be increasingly important to devise a method for saving that enormous amount of data as securely and as reliably as possible. An apparatus that writes data of such a huge size on an optical storage medium can perform the operation of seeing if (signal) marks have been recorded just as intended on the optical storage medium in order to increase the reliability of writing. Such an operation will be referred to herein as a "verify operation".

A known apparatus that performs a read/write operation on a write-once or rewritable storage medium such as an optical disc reads data that has been just written and compares the data that has been read to the data to write in order to detect an error, if any, lest the write operation should fail due to a defect on the storage medium.

Such a verify operation is often performed in a unit at which a constant write or transfer rate can be maintained, not after everything has been written. That is to say, every time the disc has turned to a predetermined degree, the write operation is suspended, a track jump is made to return to the previous location, that portion on which data has just been written is scanned to detect any error, and then a track jump is made once again to move to a different area and write the next data there. And this series of operations is carried out over and over again. That is why although reliability can be certainly ensured in this way for the data that has been written, it takes a longer time to get the write operation done.

If any error is detected when the data that has just been written is read, then the write operation is retried on another area, not the area on which the write error has occurred. On an optical disc, a set of data and its ID information are stored on the basis of a unit area called a "sector". Thus, the data that has been written with an error on a sector is rewritten on another sector (which will be referred to herein as a "replacement sector").

A known read/write apparatus that makes such data correction is disclosed in Japanese Laid-Open Patent Publication No. 59-113509 (which will be referred to herein as "Patent Document No. 1" for convenience sake), for example.

Lately, as candidate read/write apparatuses that can save and archive data for a long time in order to meet the rising demand for storing a huge size of data with as high reliability as possible, proposed are an apparatus that uses a so-called "optical tape", which is a kind of an optical storage medium in a tape shape, and an apparatus that handles a combination of multiple optical disc drives at the same time. Such a read/write apparatus to process a huge size of data should not only write and transfer data at sufficiently high rates but also keep the reliability of the written data as high as possible.

Nevertheless, for a storage medium with a low degree of random accessibility such as the tape medium, it is difficult to increase the write rate as long as such a method of writing data and checking the data just written time-sequentially over and over again is adopted as in the known optical disc drive described above.

Thus, to meet such a demand, a so-called "DRAW (direct read after write)" technique for performing a write operation and a read operation for verification purposes at the same time has been proposed.

A known read/write apparatus that adopts such a DRAW technique is disclosed in Japanese Laid-Open Patent Publication No. 63-249941 (which will be referred to herein as "Patent Document No. 2" for convenience sake), for example. FIGS. 21A through 21C illustrate an exemplary arrangement and operation of an optical pickup as disclosed in Patent Document No. 2.

As shown in FIG. 21A, the optical system of this optical pickup includes a light source 410, a diffractive element 411, a polarization beam splitter 403, a wave plate 404, a collimator lens 405, a mirror 406, an objective lens 407, a detector lens 402, and a photodetector 401. The light emitted from the light source 410 gets diffracted by the diffractive element 411 and split mainly into a zero-order light beam and ±first-order light beams, which are then condensed by the objective lens 407, thereby forming three condensed beam spots (that are a main spot and two sub-spots) on the same track on the optical storage medium 408.

FIG. 21B illustrates the arrangement of light beam spots that are formed on the surface of the optical storage medium 408.

In the example illustrated in FIG. 21B, the main spot 500 formed by the zero-order light beam is a write beam spot, which is used to write a signal on the storage medium. On the other hand, the two sub-spots 510 and 520 formed by the ±first-order light beams are read beam spots, which are used to read the written signal. Due to the efficiency ratio of the diffraction grating, the intensities of the ±first-order light beams are much lower than that of the zero-order light beam. That is why the signal that has been written is never erased or altered by the two sub-spots 510, 520.

The main spot 500 and the sub-spots 510 and 520 are located on the same track. And these spots move on the storage medium in the direction indicated by the arrow a. Such movement of the main spot on a track of a storage medium will be referred to herein as "scanning the storage medium with a write beam". In the same way, such movement of the sub-spots on a track of a storage medium will be referred to herein as "scanning the storage medium with a read beam". In performing a DRAW operation, the same location on an optical storage medium is scanned with a write beam before being scanned with a read beam. More specifically, of these two sub-spots, the sub-spot 510 moves behind the write spot to read the recorded mark. Meanwhile, the other sub-spot 520 moves ahead of the write spot, and its reflected light includes no information about the recorded mark. These light beams are reflected from the optical storage medium 408, transmitted through the optical system, and then incident on the photodetector 401, which detects their quantities of light.

FIG. 21C illustrates the arrangement of photodiodes in the detector 401.

The main quadruple photodiode 121 shown in FIG. 21C receives the zero-order light beam (i.e., the reflected light of the main spot). The magnitude of astigmatism produced by the detector lens 402 shown in FIG. 21A changes with the degree of defocusing, thereby detecting a focus signal. The main photodiode 121 also detects a tracking error signal by the push-pull method. On the other hand, the sub-photodiodes 122 and 123 receive reflected light of the sub-spots 510 and 520, respectively.

The light source 410 emits a light beam that has been modulated with a modulation signal in order to record mark on the optical storage medium 408.

Naturally, the read beams that have been emitted from the same light source 410 have also gone through that modulation. That is why the reflected light of the sub-spot 510 that moves behind the write spot in the two read spots of the ±first-order light has a signal component, to which a variation in reflectance caused by a recorded mark and a variation in the quantity of light due to the modulation of light have been added. Meanwhile, the other sub-spot 520 moves ahead of the main spot 500 through an unrecorded portion, and therefore, its reflected light has not been affected by the variation in reflectance caused by the recorded mark. Consequently, only a signal representing a variation in the quantity of light due to the modulation of the light by the light source is obtained from the reflected light of the sub-spot 520 that moves ahead of the main spot 500. For that reason, by performing a differential arithmetic operation on the two signals representing those two sub-beams, a read signal (i.e., a monitor signal for verification purposes) can be obtained.

By adopting the DRAW technique for forming the write spot (i.e., the main spot 500) and the read spots (i.e., the sub-spots 510 and 520) at the same time and for reading a signal that has just been written while performing a write operation, a system that achieves even higher write and transfer rate and ensures a good deal of reliability is realized.

As for the DRAW technique described above, however, the following respects need to be considered.

First of all, as already described for the example of the related art, in order to realize a simple and low cost OPU (optical pickup unit) including multiple optical pickups to be built in an optical tape read/write apparatus, for example, structurally it is appropriate to split the light emitted from a single light source into a read beam and a write beam. In that case, however, a write modulated signal will get superposed on a signal generated by the read beam, and therefore, the write modulated signal component should be canceled from the read signal as is done in the example of the related art.

Meanwhile, even a read/write apparatus that is ordinarily used for archival purposes should presumably rewrite the data stored. In such a situation, a proper read signal should be able to be obtained even while the operation of overwriting something on data already written is being performed.

Furthermore, in a system such as an optical tape read/write apparatus, the tracking direction as viewed from an optical pickup could possibly be bidirectional instead of unidirectional. Even so, the system should work with as good stability as in a situation where the tracking is carried out in one direction.

The optical read/write apparatus that has been described as an example of the related art can cancel the write modulated signal component from the read signal only when one of the two sub-beams is scanning an unrecorded area.

Embodiments of the present disclosure provides an optical pickup and optical read/write apparatus that can read a signal with good stability for verification purposes even when an overwrite operation should be performed on an area where data has already been written.

SUMMARY OF THE INVENTION

An optical pickup according to the present disclosure includes: a light source; an optical system which forms multiple light beams based on the light that has been emitted from the light source and which converges a write beam and a read beam, included in the multiple light beams, thereby forming a main spot and a sub-spot, respectively, on an optical storage medium, the optical system converging the write and read beams onto the optical storage medium so that the main spot moves through the same region on the optical storage medium ahead of the sub-spot; and a detector which senses the write and read beams that have been reflected from the optical storage medium and which generates electrical signals. The detector includes a first photodiode that receives reflected light that has left the main spot on the optical storage medium and a second photodiode that receives a portion of the reflected light that has left the sub-spot on the optical storage medium.

In one embodiment, the second photodiode is arranged so as to receive an appropriately central portion of the reflected light that has left the sub-spot.

In another embodiment, the optical system converges the write and read beams so that a condensing state of the read beam on the optical storage medium is inferior to that of the write beam on the optical storage medium.

Another optical pickup according to the present disclosure includes: a light source; an optical system which forms multiple light beams based on the light that has been emitted from the light source and which converges a write beam and a read beam, included in the multiple light beams, thereby forming a main spot and a sub-spot, respectively, on an optical storage medium, the optical system converging the write and read beams onto the optical storage medium so that the main spot moves through the same region on the optical storage medium ahead of the sub-spot; and a detector which senses the write and read beams that have been reflected from the optical storage medium and which generates electrical signals. The detector includes a first photodiode that receives reflected light that has left the main spot on the optical storage medium and a second photodiode that receives a portion of the reflected light that has left the sub-spot on the optical storage medium. The second photodiode includes first and second photoelectric transducers.

In one embodiment, the first and second photoelectric transducers are arranged so that a portion of the light that has left the sub-spot and that has come back with relatively little signal representing a mark that has been recorded on the storage medium is incident on the first photoelectric transducer and that another portion of the light that has left the sub-spot and that has come back with relatively much signal representing the recorded mark is incident on the second photoelectric transducer.

In another embodiment, the first and second photoelectric transducers are arranged so as to respectively receive central and peripheral portions of the reflected light that has left the sub-spot.

In still another embodiment, the detector generates a read signal by performing a differential arithmetic operation on the respective outputs of the first and second photoelectric transducers.

In yet another embodiment, the optical system includes a diffractive element which produces ±first-order light beams as the read beam, and the second photodiode is arranged so as to receive one of the ±first-order light beams.

In this particular embodiment, the detector further includes a third photodiode that is arranged so as to receive the other of the ±first-order light beams, and is configured to selectively output either a signal obtained by performing a differential arithmetic operation on the respective outputs of the first and second photodiodes or a signal obtained by performing a differential arithmetic operation on the respective outputs of the first and third photodiodes.

Still another optical pickup according to the present disclosure includes: a light source; an optical system which forms multiple light beams based on the light that has been emitted from the light source and which converges a write beam and a read beam, included in the multiple light beams, thereby forming a main spot and a sub-spot, respectively, on an optical storage medium, the optical system converging the write and read beams onto the optical storage medium so that the main spot moves through the same region on the optical storage medium ahead of the sub-spot; an optical extractor which extracts a portion of the light that has left the sub-spot on the optical storage medium, and a detector which senses the write and read beams that have been reflected from the optical storage medium and which generates electrical signals. The detector includes a first photodiode that receives reflected light that has left the main spot on the optical storage medium, a second photodiode that receives the reflected light that has left the sub-spot on the optical storage medium, and a third photodiode that receives the reflected light that has been extracted by the optical extractor and that has left the sub-spot.

In one embodiment, the detector generates a read signal by performing a differential arithmetic operation on the respective outputs of the second and third photodiodes.

In another embodiment, the second and third photodiodes are arranged so that one of the second and third photodiodes receives a central portion of the reflected light that has left the sub-spot.

In still another embodiment, the extractor extracts multiple portions of the reflected light that has left the sub-spot, and the third photodiode has a plurality of photoelectric transducers.

In yet another embodiment, the first photodiode has been divided into multiple areas, a main tracking error signal is generated by a push-pull method based on signals obtained from the multiple areas of the first photodiode, a sub-tracking error signal is generated by the push-pull method based on signals obtained from multiple areas of the second photodiode, and a tracking error signal is generated based on the main and sub-tracking error signals.

An optical read/write apparatus according to the present disclosure includes at least one optical pickup according to any of the embodiments described above and reads and writes data from/on an optical storage medium.

According to an embodiment of the present disclosure, the signal obtained from the first photodiode includes a recorded mark component and a component representing a variation in the intensity of light due to the optical modulation of the light source, while the majority of the signal obtained from the second photodiode is a component representing a variation in the intensity of light due to the optical modulation of the light source. That is why by calculating their difference, the recorded mark component, i.e., a DRAW signal, can be obtained.

Other features, elements, processes, steps, characteristics and advantages of the present disclosure will become more apparent from the following detailed description of embodiments of the present disclosure with reference to the attached drawings.

DETAILED DESCRIPTION OF EMBODIMENTS

Embodiment 1

Hereinafter, embodiments of an optical read/write apparatus according to the present disclosure will be described. An optical read/write apparatus as an embodiment of the present disclosure is an optical data streamer apparatus that uses an optical tape as an optical storage medium. Such an optical data streamer apparatus may be used to back up a huge quantity of data. In order to back up such an enormous quantity of data in a short time with the transfer rate increased, the optical data streamer apparatus includes a lot of optical pickups. It should be noted that the optical read/write apparatus of the present disclosure does not have to be an optical data streamer apparatus but may also be an optical disc apparatus or any other kind of apparatus. In the case of an optical disc apparatus, the optical storage medium is not an optical tape but an optical disc.

Figure 1A:
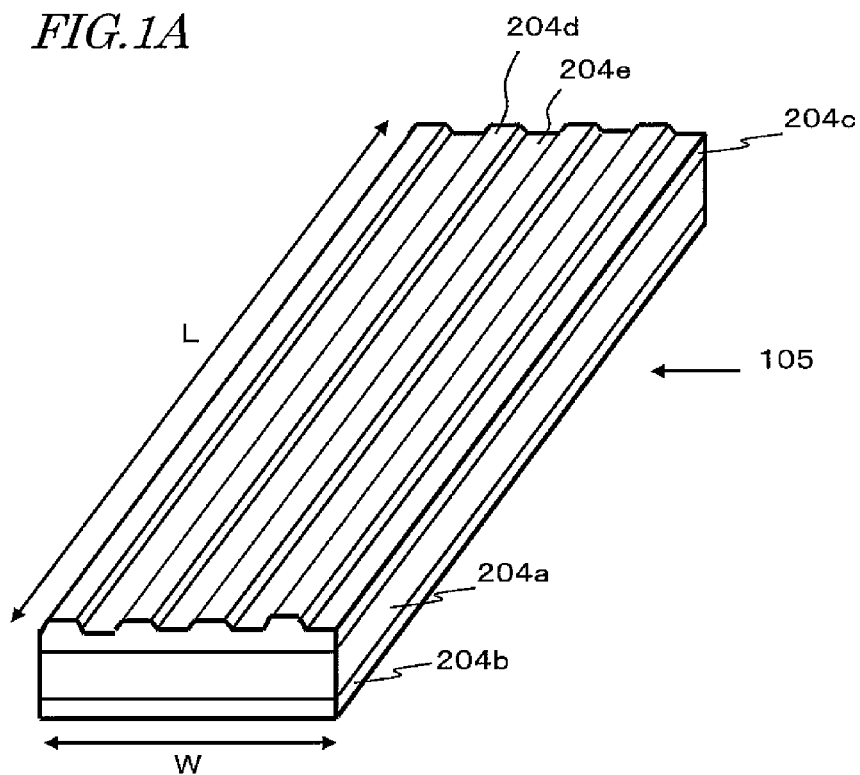
FIG. 1A is a perspective view schematically illustrating a portion of an optical tape 105 on a larger scale.

FIG. 1A is a perspective view schematically illustrating a portion of an optical tape 105 on a larger scale. The optical tape 105 may include a base film 204a, a back coating layer 204b that is adhered to the back surface of the base film 204a, and an imprint layer 204c that is supported by the base film 204a. On the upper surface of the imprint layer 204c, lands 204d and grooves 204e have been formed. Although not shown in FIG. 1A, a reflective film and a recording material film are deposited over the entire upper surface of the imprint layer 204c. The optical tape 105 is extended in the longitudinal direction L and may have a length of several hundred meters, for example. Its width W may be set within the range of a few millimeters to several centimeters, and its thickness may be within the range of a few micrometers to several ten micrometers.

It should be noted that FIG. 1A illustrating the optical tape 105 is not to scale. Actually, the optical tape 105 may have several hundreds, or an even greater number, of lands 204d and grooves 204e. In one embodiment, data is written on either the lands 204d or the grooves 204e. The lands 204d or the grooves 204e on which data is written will be referred to herein as "tracks", which may have a pitch of 0.2 μm to 0.4 μm, for example.

Figure 1B:
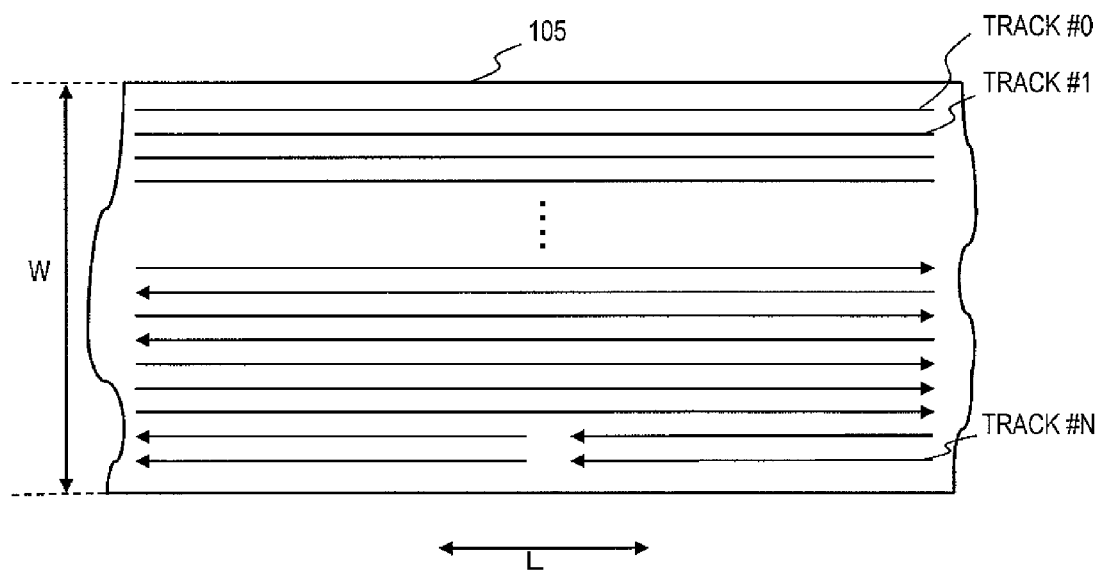
FIG. 1B is a plan view schematically illustrating a portion of the optical tape 105.

FIG. 1B is a plan view schematically illustrating a portion of the optical tape 105. As shown in FIG. 1B, N (which is an integer that is typically equal to or greater than 100) tracks #0 through #N have been formed to run in the longitudinal direction L. Some of those tracks shown in FIG. 1B are illustrated with an arrow. Each of those arrows indicates the direction in which data is written. That is to say, data can be written in multiple different directions on a single optical tape 105.

On the optical tape 105, a mark can be recorded optically by irradiating the tape 105 with a light beam. More specifically, such a mark is recorded on its recording material film. The light beam is radiated by an "optical pickup" that includes a light source and an objective lens that focuses the light beam emitted from the light source on the optical tape 105. When the optical pickup irradiates the optical tape 105 with a light beam, the irradiated portion of the optical tape 105 comes to have a different optical property such as a refractive index from the rest (i.e., the non-irradiated portion) of the optical tape 105. Such a portion, of which the optical property has changed in this manner, is called a "recorded mark".

In optical tape technologies, data can be read out from the optical tape 105 by irradiating the tape 105 with a relatively weak light beam with a constant intensity and detecting the light that has been modulated by, and reflected from, the optical tape 105. In writing data on the optical tape 105, data is written there by irradiating the optical tape 105 with a pulsed light beam, of which the optical power has been changed according to the data to be written, and locally changing the property of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 105, the light beam always needs to maintain a predetermined converging state on a target track. For that purpose, a "focus control" and a "tracking control" need to be done. The "focus control" means controlling the position of an objective lens along a normal to the surface (i.e., information storage layer) of the optical tape 105 so that the focal point (or at least the converging point) of the light beam is always located on the target track. On the other hand, the "tracking control" means controlling the position of the objective lens parallel to the information storage layer of the optical tape 105 and perpendicularly to the track so that the light beam spot is always located right on the target track.

In order to perform such a focus control or a tracking control, the focus error or the tracking error needs to be detected based on the light that has been reflected from the optical tape 105 and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical tape 105.

Figure 2A:
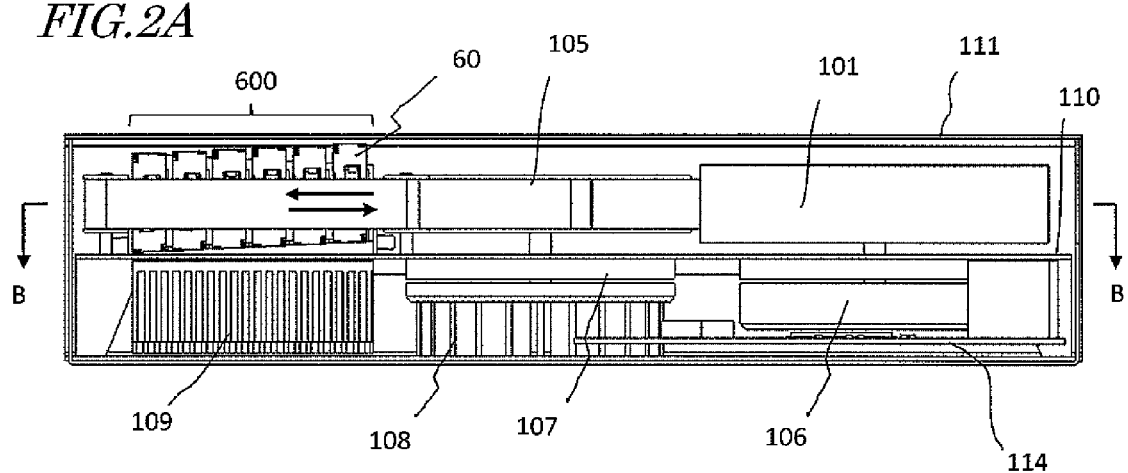
FIG. 2A illustrates an exemplary arrangement for an optical data streamer apparatus as a first embodiment of the present disclosure.
Figure 2B:
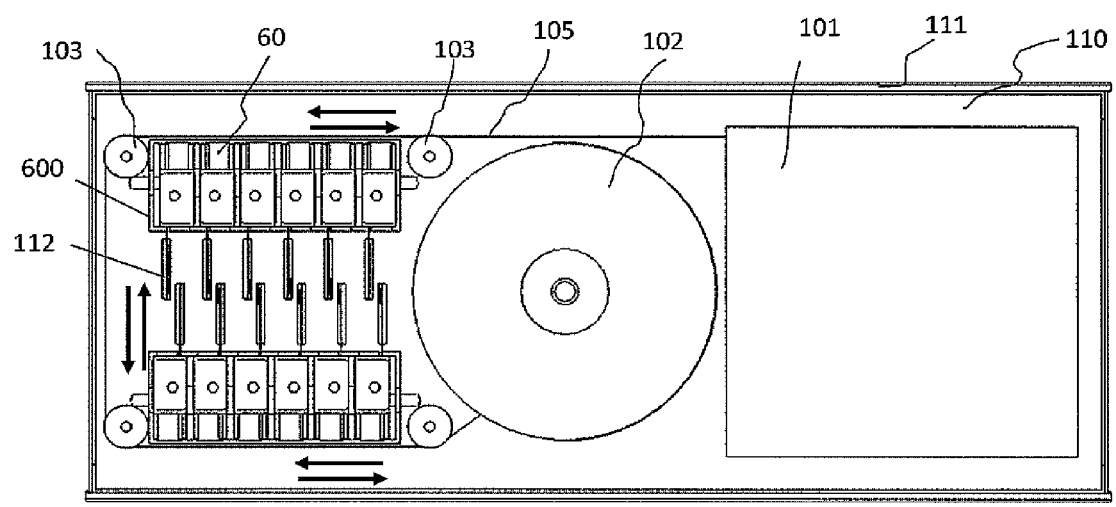
FIG. 2B is a cross-sectional view of the apparatus as viewed on the plane B-B shown in FIG. 2A.

FIG. 2A illustrates an exemplary arrangement for an optical data streamer apparatus as an embodiment of the present disclosure, and FIG. 2B is a cross-sectional view of the apparatus as viewed on the plane B-B shown in FIG. 2A. In the embodiment illustrated in FIG. 2A, the upside corresponds to perpendicularly upside, and the downside corresponds to perpendicularly downside. Thus, FIG. 2B illustrates an exemplary internal arrangement of this optical data streamer apparatus as viewed from right over the apparatus.

FIGS. 2A and 2B illustrate a situation where the apparatus is loaded with a tape cartridge 101 in which the optical tape 105 is housed. The tape cartridge 101 is readily attachable and removable to/from the apparatus. And the optical data streamer apparatus shown in FIGS. 2A and 2B is loaded with a selected one of multiple tape cartridges 101 that have the same shape.

The optical data streamer apparatus of this embodiment includes a housing 111, a chassis 110 that is arranged inside of the housing 111, a plurality of pickup parts 60 that are arranged so as to write data on the optical tape 105, and a radiator 109. Those pickup parts 60 are positioned by a positioning mechanism provided for an optical pickup assembly 600.

More specifically, this optical data streamer apparatus includes motors 106 and 107 that make the optical tape 105 run, guide posts 103 and a winding spool 102. The motor 107 is mechanically interlocked with the winding spool 102 and turns the winding spool 102. On the other hand, the motor 106 is mechanically interlocked with the shaft of the tape cartridge 101 loaded and operates so as to wind the tape 105, which has been pulled out of the tape cartridge 101, back to the tape cartridge 101. Using these two motors 106 and 107, the tape 105 can run in both of the two directions that are indicated by the arrows.

The optical pickup assembly 600 includes a number of pickup parts 60, which are arranged in the direction in which the optical tape 105 runs. The optical pickup assembly 600 of this embodiment has upper and lower arrays of pickup parts 60. In the housing 111, arranged is a blower fan 108 that is mechanically coupled to the motor 107. That is why as the motor 107 turns, the blower fan 108 turns, too.

Each pickup part 60 has a single or multiple optical pickups. The configuration of each optical pickup will be described in detail later. The pickup parts 60 are connected to flexible printed circuit boards (FPCs) 112 for optical pickups. This optical data streamer apparatus further includes a circuit board (not shown) that is connected to the flexible printed circuit boards 112 and that includes circuit components that control the pickup parts 60 and the motors 106 and 107. Optionally, the pickup parts 60 and a circuit that would normally be mounted on another circuit board could be partially arranged on the flexible printed circuit boards 112.

Hereinafter, an exemplary circuit configuration for an optical data streamer apparatus according to this embodiment will be described with reference to FIG. 3.

Figure 3:
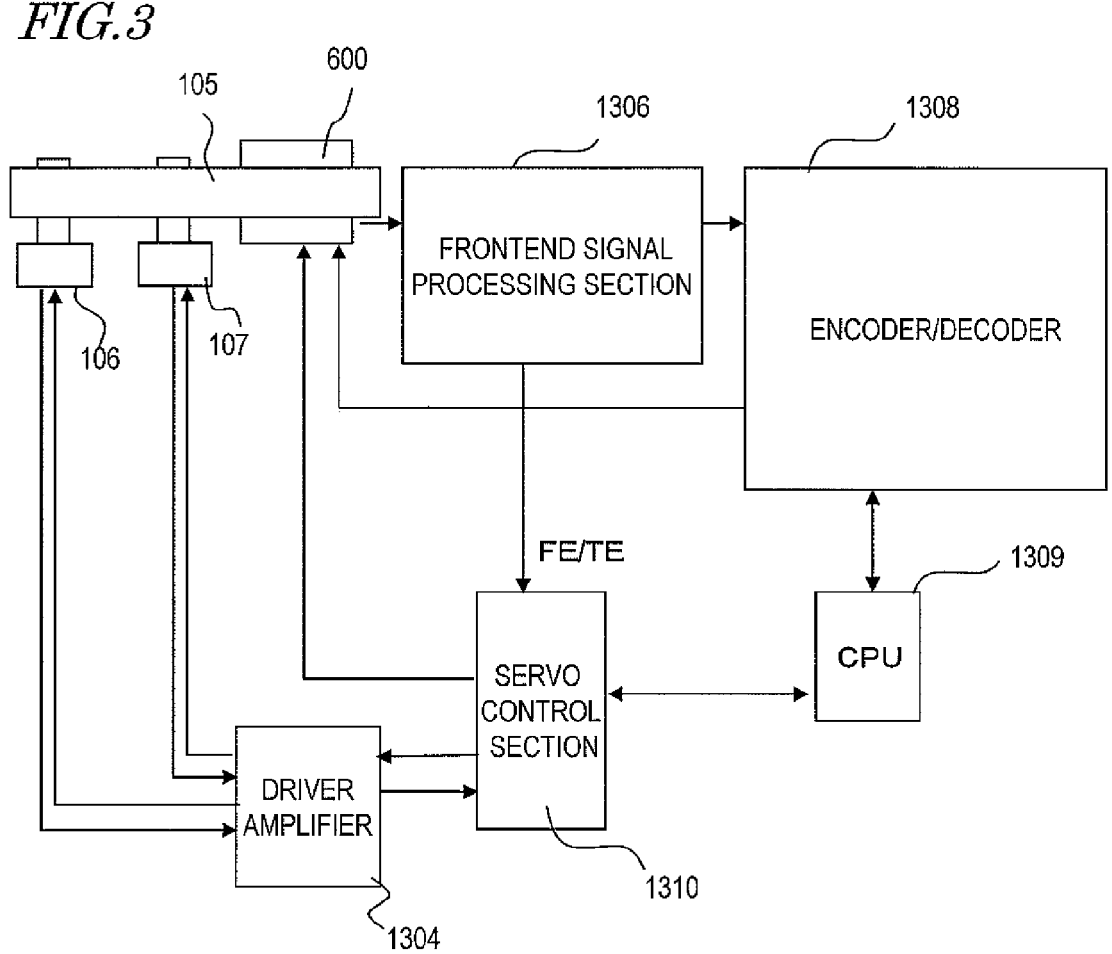
FIG. 3 illustrates an exemplary circuit configuration for an optical data streamer apparatus according to the first embodiment of the present disclosure.

The optical data streamer apparatus illustrated in FIG. 3 includes circuit blocks that are electrically connected to the optical pickup assembly 600 and motors 106 and 107.

In the exemplary configuration shown in FIG. 3, the output of the optical pickup assembly 600 is supplied to an encoder/decoder 1308 by way of a frontend signal processing section 1306. In reading data, the encoder/decoder 1308 decodes the data that is stored on the optical tape 105 based on the signal that has been generated by the optical pickup assembly 600. In writing data, on the other hand, the encoder/decoder 1308 encodes the data to generate a signal to be written on the optical tape 105 and outputs the signal to the optical pickup assembly 600.

The frontend signal processing section 1306 generates a read signal based on the output of the optical pickup assembly 600, and also generates a focus error signal FE and a tracking error signal TE. The focus error signal FE and the tracking error signal TE are then supplied to a servo control section 1310. In response, the servo control section 1310 gets the motors 106 and 107 controlled by a driver amplifier 1304. The servo control section 1310 also gets the position of an objective lens controlled by a lens actuator in the optical pickup assembly 600. The encoder/decoder 1308, the servo control section 1310 and all the other components are controlled by a CPU 1309. The blocks illustrated in FIG. 3 can be implemented by assembling together integrated circuit elements, memories and other electronic parts on a circuit board.

The information storage layer of the optical tape 105 that can be used in this embodiment may have a width of about 10 mm, for example. In that case, data can be read and written from/on the running optical tape 105 over the entire width of the information storage layer thereof by twenty-four optical pickups, for example.

Before the tape cartridge 101 is loaded into this optical data streamer apparatus, the optical tape 105 housed in the tape cartridge 101 has been wound around a spool (not shown). And when the tape cartridge 101 is loaded into the optical data streamer apparatus, the optical tape 105 is pulled out while being guided by a number of tape guide posts 103 and then wound around the winding spool 102. Each of the pickup parts 60 is fixed at a predetermined position with respect to the optical tape 105 so as to read and write information from/on the optical tape 105. In this embodiment, twenty-four optical pickups are provided, and therefore, data can be read and written simultaneously by using a maximum of twenty-four optical pickups. It should be noted that the number of optical pickups provided for a single optical data streamer apparatus does not have to be, and may be greater or smaller than, twenty-four.

The feed motor 107 drives and turns the winding spool 102, thereby running the optical tape 105 in the forward direction. At the same time, the feed motor 107 also drives the blower fan 108. On the other hand, the reverse motor 106 drives and turns a spool (not shown) in the tape cartridge 101, thereby running the optical tape 105 in the reverse direction. In the meantime, as the winding spool 102 is also driven by the optical tape 105, the blower fan 108 is turned, too. As the pickup parts 60 are thermally coupled to the radiator 109, the heat generated by the pickup parts 60 is transferred to the radiator 109.

During reading or writing, the optical tape 105 is run either in the forward direction by the feed motor 107 or in the reverse direction by the reverse motor 106, while those optical pickups can perform a read/write operation on the optical tape 105 at the same time.

Hereinafter, the arrangement of an optical system for use in this embodiment will be described.

Figure 4:
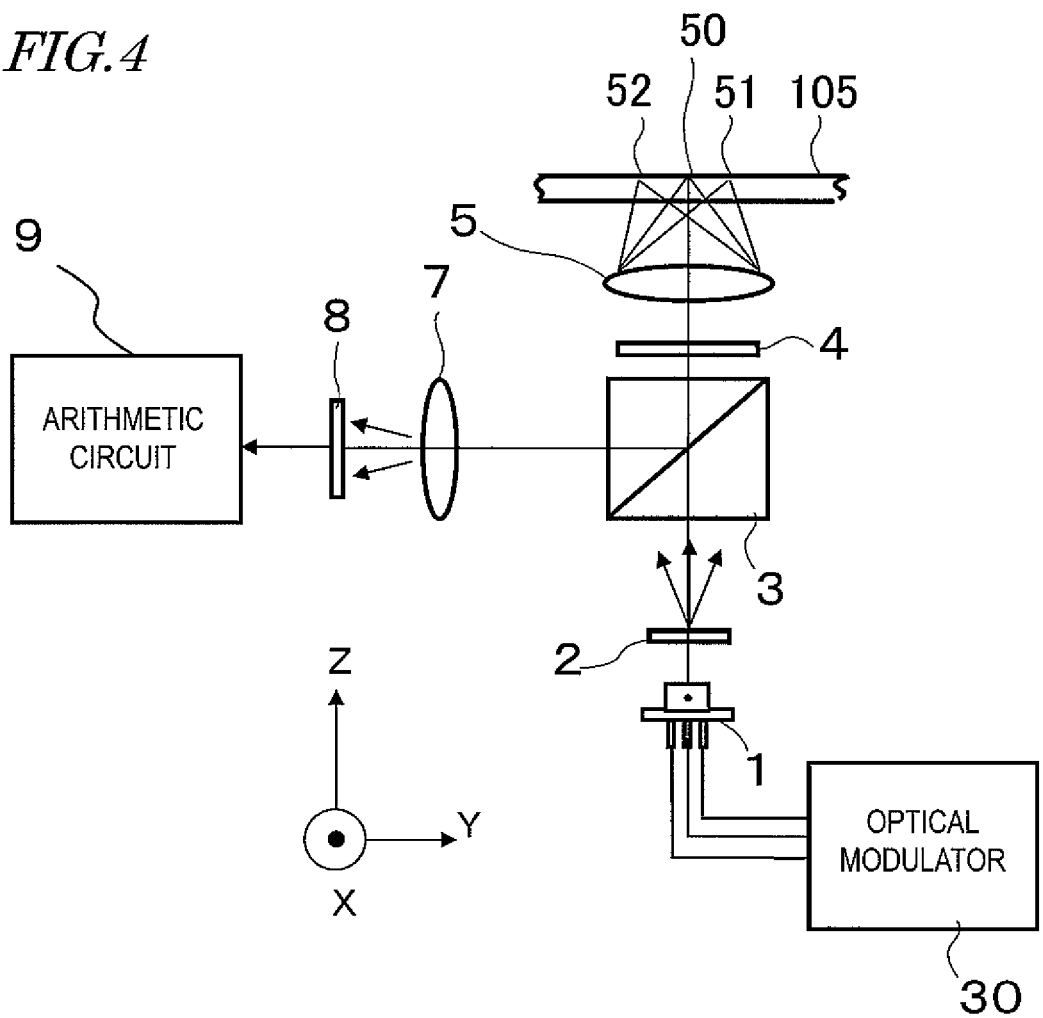
FIG. 4 illustrates an arrangement of an optical pickup according to the first embodiment of the present disclosure.

FIG. 4 illustrates an arrangement of an optical system for an optical pickup according to this embodiment.

This optical pickup includes a laser light source 1 and an optical system that forms multiple light beams based on the light that has been emitted from the laser light source 1 and that converges a write beam and a read beam, included in the multiple light beams, thereby forming a main spot 50 and a sub-spot 51, 52, respectively, on an optical storage medium (e.g., the optical tape 105). This optical system converges the write and read beams onto the optical storage medium so that the main spot 50 moves through the same location on the optical tape 105 ahead of the sub-spot 51. Even if multiple sub-spots are formed, the main spot 50 formed by the write beam also moves ahead of the sub-spot for reading (i.e., the sub-spot 51 formed by the read beam). It can be determined adaptively according to the running direction of the optical storage medium which of the multiple subs-pots is going to be used as the sub-spot for reading. That is to say, if the running direction of the optical tape 105 reverses, then the light beam that forms the sub-spot 52 becomes the read beam. A more specific configuration for such an optical system will be described later.

This optical pickup further includes a photodetector which senses the write and read beams that have been reflected from the optical tape 105 and which generates electrical signals, and an optical modulator (light source driver) 30, which is connected to the laser light source 1 and which modulates the optical output of the laser light source 1 so that a mark is recorded on the optical tape 105 with a write beam in the write mode. The photodetector 8 includes a first photodiode that receives the reflected light that has left the main spot 50 on the optical tape 105 (i.e., the reflected light of the write beam) and a second photodiode that receives a portion of the reflected light that has left the sub-spot on the optical tape 105 (i.e., the reflected light of the read beam). The configuration of the photodetector 8 will also be described in detail later.

It should be noted that the optical modulator 30 functioning as a light source driver does not have to be included in the optical pickup but could be provided either partially or even entirely outside of the optical pickup. In other words, the optical read/write apparatus with an optical pickup just needs to include the light source driver.

As shown in FIG. 4, the light that has been emitted from the laser light source 1 gets diffracted and split by the diffractive element 2 into a zero-order light beam and ±first-order light beams. Those light beams are transmitted through, and transformed into circularly polarized light beams by, a polarization beam splitter 3 and a wave plate 4 and then condensed by an objective lens 5, thereby leaving light beam spots on the information storage layer of the optical tape 105. In the following description, the zero-order light beam and the light beam spot left by the zero-order light beam will be referred to herein as a "main beam" and a "main spot 50", respectively, and the ±first-order light beams and the light beam spots left by the ±first-order light beams will be referred to herein as "sub-beams" and "sub-spots 50 and 51", respectively.

On their way back, the light beams that have been reflected from the optical tape 105 are transmitted through, and transformed into linearly polarized light beams (that are perpendicular to the light beams on their way toward the optical tape 105) by, the objective lens 5 and the wave plate 4, reflected by the polarization beam splitter 3, given astigmatism by a detector lens 7, and then received by photodiodes of the photodetector 8. The optical modulator 30 shown in FIG. 4 is used to record a mark on the optical tape 105.

In the following description, the direction that is parallel to the optical axis of the objective lens 5 will be referred to herein as "Z-axis direction", the width direction of the optical tape 105 as "X-axis direction" and the running direction (i.e., the tangential direction) of the optical tape 105 as "Y-direction", respectively, as shown in FIG. 4 unless stated otherwise. It should be noted that even if the optical axis is refracted by a mirror or a prism in an optical system for an optical pickup, the directions will also be defined with respect to the optical axis and the map of the optical tape 105.

Figure 5:
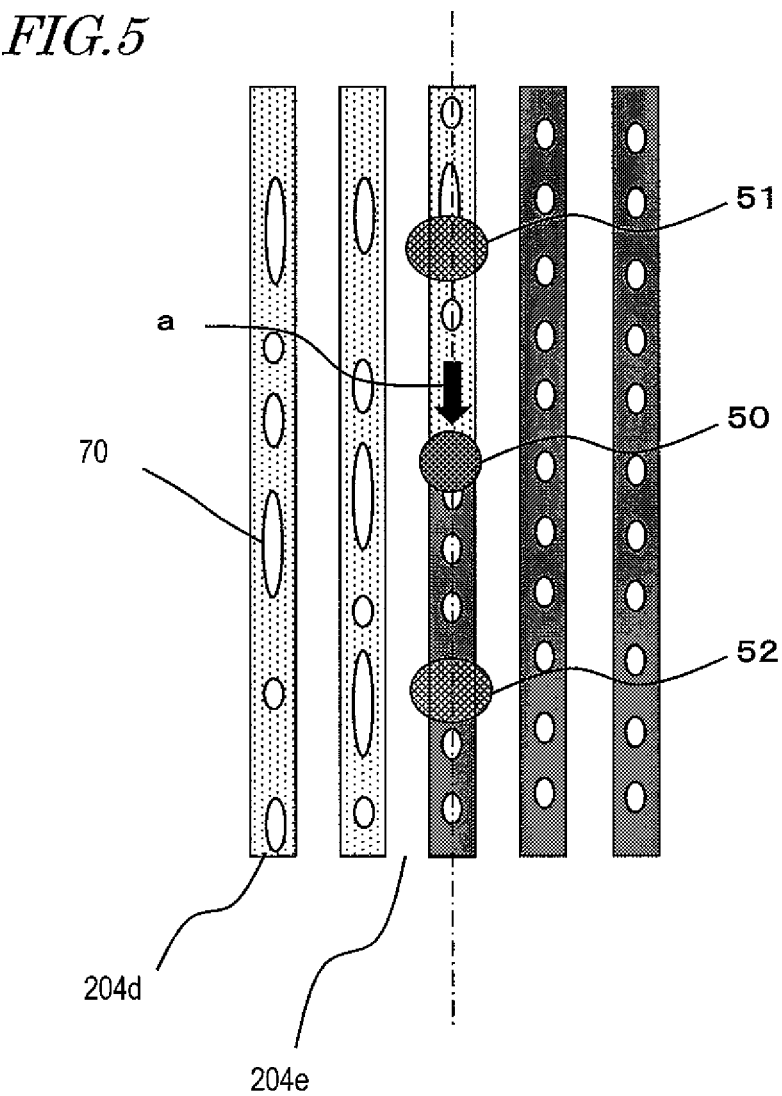
FIG. 5 illustrates spots formed on an optical storage medium in the first embodiment of the present disclosure.

FIG. 5 illustrates an arrangement of a main spot 50 and sub-spots 51 and 52 that have been condensed onto the information storage layer of the optical tape 105. The optical tape 105 has an uneven surface. The main spot 50 and the sub-spots 51 and 52 move along a recording track (i.e., a land portion 204d, which may be a raised portion of the uneven surface) on which a mark 70 will be recorded in the direction indicated by the arrow a. Actually, however, the spots are fixed and the optical tape 105 runs in the direction opposite to the one indicated by the arrow a. It should be noted that on the recording track shown in FIG. 5, marks 70 have already been recorded even where data is going to be written, which means that the old data is going to be overwritten. In this embodiment, no marks 70 are recorded on any groove 204e of the optical tape 105.

Figure 6:
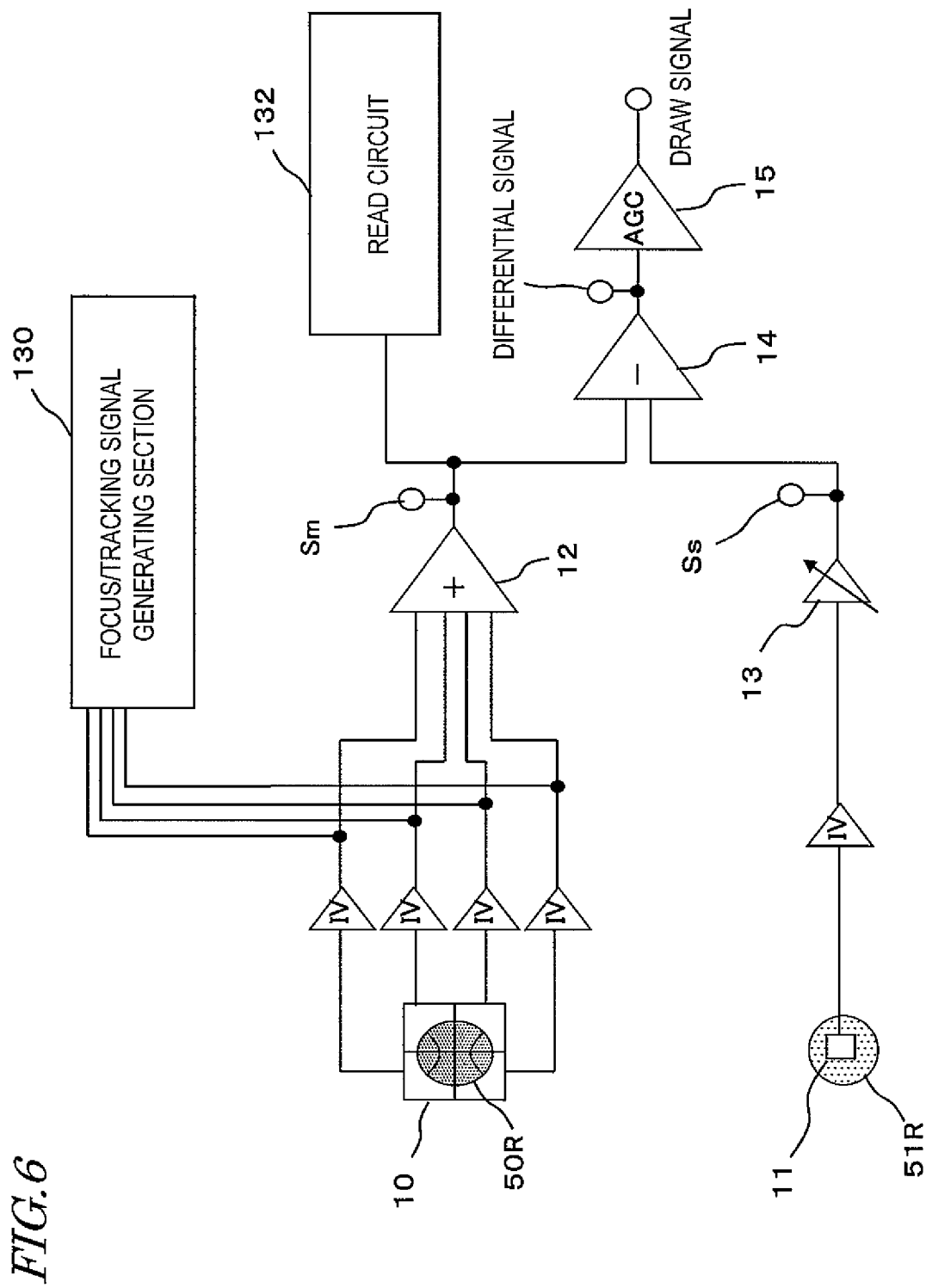
FIG. 6 illustrates an exemplary configuration for detecting a signal according to the first embodiment of the present disclosure.

FIG. 6 illustrates a configuration for the photodiode of the photodetector 8 shown in FIG. 4 and also is a block diagram of a circuit that carries out signal processing using its section from the photodetector 8 through an arithmetic circuit 9.

On the photosensitive plane of the photodetector 8, formed are the spot 50R of the reflected light that has left the main spot 50 and the spot 51R of the reflected light that has left the sub-spot 51. In the following description, the spot left on the photosensitive plane of the photodetector 8 by the reflected light that has left the main spot 50 will be sometimes referred to herein as a "main spot 50R" and the spots left on the photosensitive plane of the photodetector 8 by the reflected light beams that have left the sub-spots 51 and 52 will be sometimes referred to herein as a "sub-spots 51R and 52R" for the sake of simplicity.

The main photodiode 10 is arranged to receive the reflected light that has left the main spot 50 and detects a main tracking error signal by the push-pull method. Specifically, as shown in FIG. 6, the main photodiode 10 is arranged in an area that covers the main spot 50R entirely. As the magnitude of the astigmatism produced by the detector lens 7 shown in FIG. 4 changes with the degree of defocusing, the main photodiode 10 can detect a focus signal. The output of the main photodiode 10 is supplied to a focus/tracking signal generating section 130. The tracking error signal and focus error signal can be generated by known techniques, and therefore, a detailed description thereof will be omitted herein.

On the other hand, the sub-photodiode 11 is arranged to receive a part of the reflected light that has left the sub-spot 51. That is to say, the sub-photodiode 11 is arranged to receive not all, but only a part, of the reflected light that has left the sub-spot 51R. Since the reflected light that has left the sub-spot 51 does not pass through the axis of the optical system unlike the light that has left the main spot 50, the former light is subject to the influence of transverse chromatic aberration. As a result, the sub-spot 51 comes to have an inferior condensing state to the main spot 50.

In the example illustrated in FIG. 5, the sub-spot 51 for reading passes through an area, which the main spot 50 has already passed through, after the main spot 50. That is why the intensity of the reflected light that has left the sub-spot 51 varies due to the influence of the recorded mark 70. However, since the condensing state of the sub-spot 51 is relatively bad as described above, the reflected light that has left the sub-spot 51 includes a smaller signal component representing the recorded mark 70 than the reflected light that has left the main spot 50. Also, the signal component representing the recorded mark 70 is included relatively profusely in the areas that precede and follow the sub-spot 51R. This respect will be described with reference to FIGS. 7A, 7B, 7C and 7D.

Figure 7A:
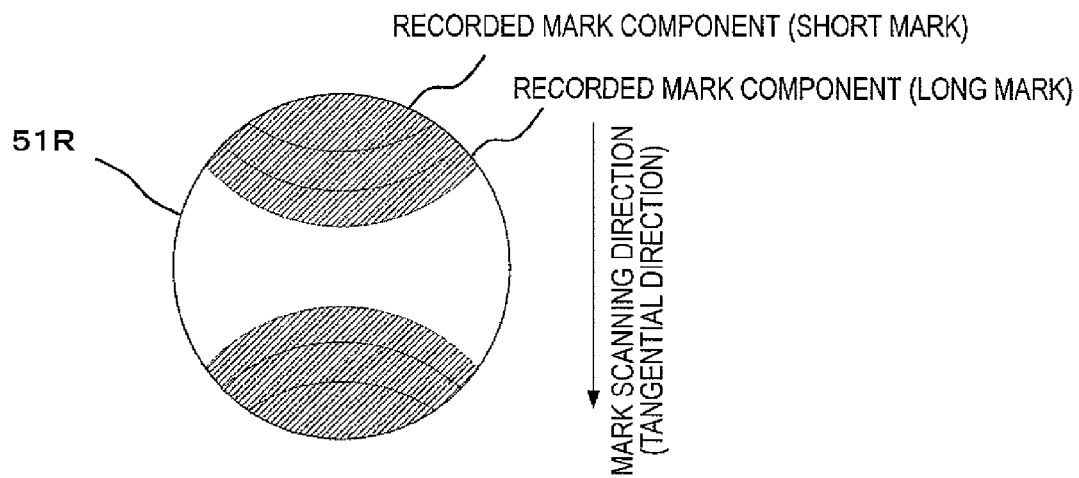
FIG. 7A schematically illustrates a sub-spot formed on the photosensitive plane of the photodetector 8 in the first embodiment of the present disclosure.

FIG. 7A schematically shows the intensity distribution of the sub-spot 51R to be left on the photosensitive plane of the photodetector 8. A row of recorded marks 70 that have been formed on a track of the optical tape 105 functions just like a diffraction grating with respect to a sub-beam. That is why interference is produced on the sub-beam and a cross section of the sub-beam that has been reflected from an optical storage medium comes to have an intensity distribution due to the presence of the row of recorded marks 70. As a result, a cross section of the reflected light that has left the sub-spot includes a portion, of which the intensity has been modulated significantly by a recorded mark 70, and a portion, of which the intensity has been hardly modulated by a recorded mark 70.

Such portions, of which the intensity has been modulated significantly by the recorded mark 70, are located in the vicinity of both ends of the spot in the Y direction. If the sub-spot passes over a short recorded mark 70, the interference produced will be as if a sub-beam was incident on a diffractive element with a short grating pitch. On the other hand, if the sub-spot passes over a long recorded mark 70, the interference produced will be as if a sub-beam was incident on a diffractive element with a long grating pitch.

Figure 7B:
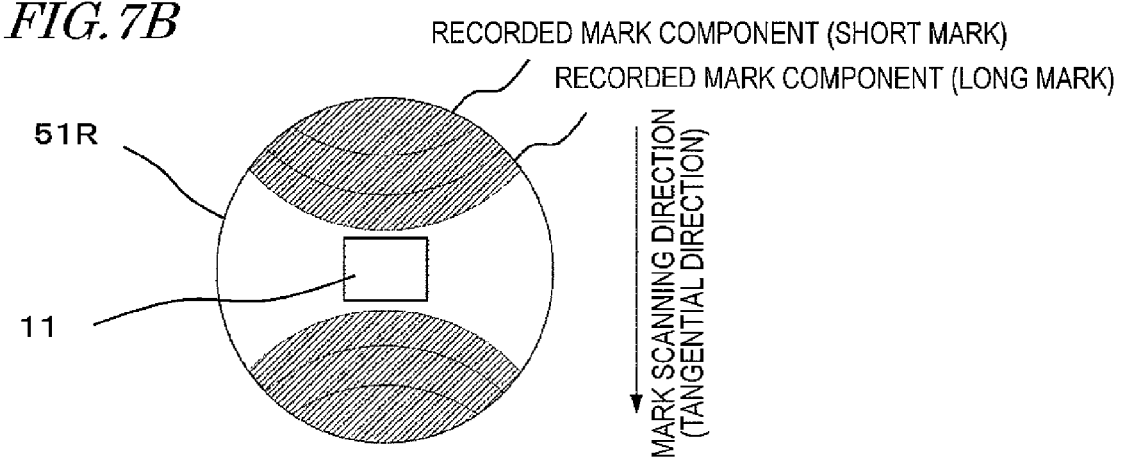
FIG. 7B illustrates an exemplary sub-photodiode for the photodetector 8 in the first embodiment of the present disclosure.

With these features taken into account, the photodiode 11 is arranged in a portion of the sub-spot 51R in which there is relatively little signal component representing the recorded mark 70. For example, if a photodiode 11, which is smaller than the sub-spot 51R, is arranged around the center of the sub-spot 51R as shown in FIGS. 6 and 7B, a signal, including relatively little signal component representing the recorded mark 70, can be detected.

Figure 7C:
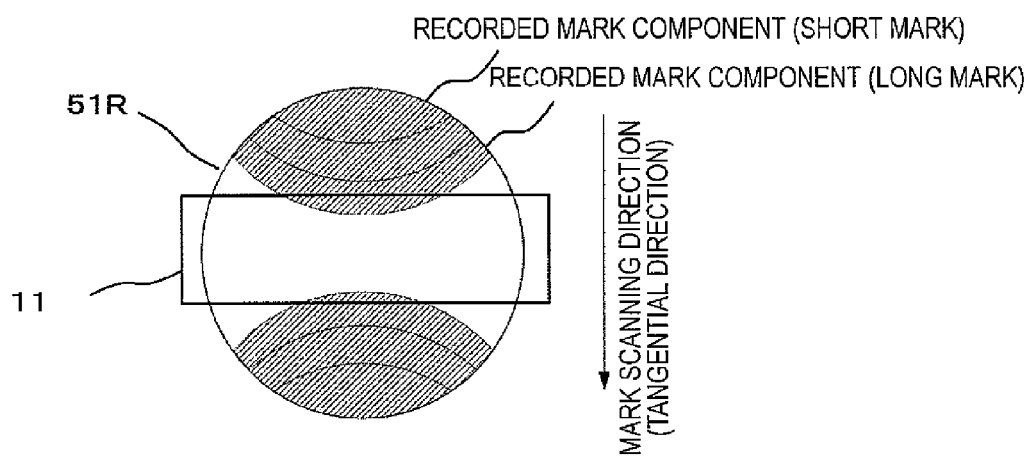
FIG. 7C illustrates another exemplary sub-photodiode for the photodetector 8 in the first embodiment of the present disclosure.
Figure 7D:
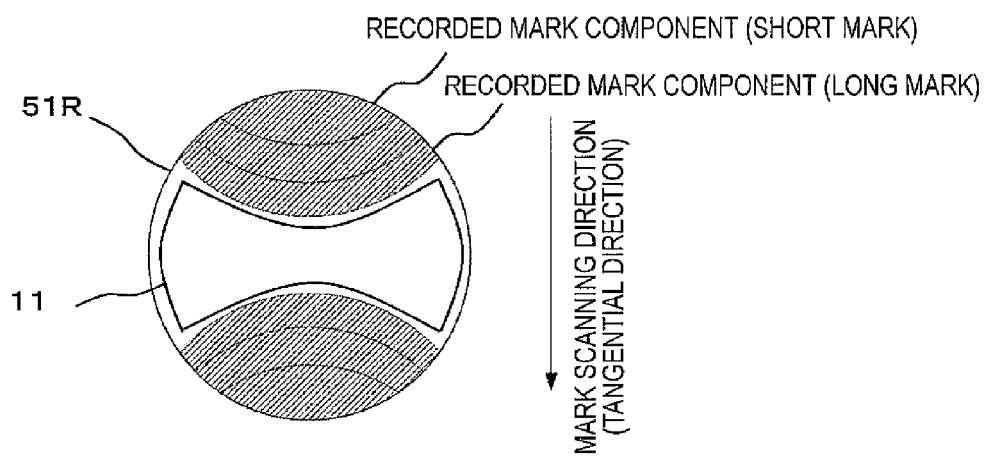
FIG. 7D illustrates still another exemplary sub-photodiode for the photodetector 8 in the first embodiment of the present disclosure.

FIGS. 7C and 7D illustrate other exemplary configurations and arrangements for the photodiode 11. In each of these examples, the photodiode 11 has a shape, of which the size as measured in the Y direction is smaller than the diameter of the sub-spot 51R, and is arranged so as to cover the center of the sub-spot 51R. On the other hand, the size of the photodiode 11 as measured perpendicularly to the Y direction, i.e., in the X direction, may be larger than the diameter of the sub-spot 51R as shown in FIG. 7C. The photodiode 11 may have a non-rectangular shape, too, as shown in FIG. 7D.

Figure 8:
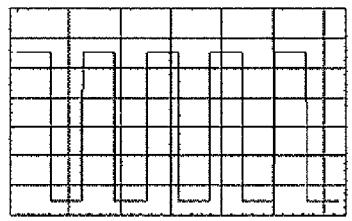
FIG. 8 is a schematic representation illustrating how to perform signal processing according to the first embodiment of the present disclosure.
Figure 8:
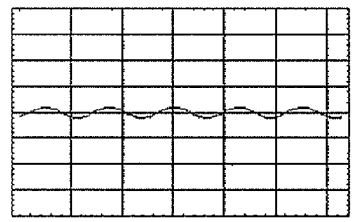
Figure 8:
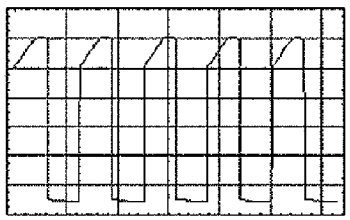
Figure 8:
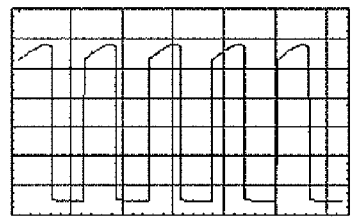
Figure 8:
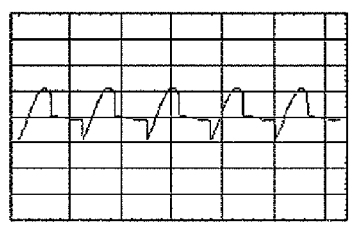
Figure 8:
Figure 8:
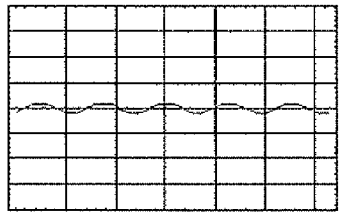

In the write mode, the light source 1 emits light that has been modulated in order to record marks on the optical tape 105. That is why the main and sub-beams, which have been formed by getting the light emitted from the light source 1 diffracted and split by the diffractive element 2, have also been modulated in the same way before impinging on the optical tape 105. When reflected from the optical tape 105, the main beam is modulated by the recorded mark 70 being formed by itself. As a result, the reflected light of the main beam includes not only the optically modulated component for writing but also a signal component representing the mark 70 being recorded as well. FIG. 8 shows a simulated waveform of a main beam signal Sm in which all of those components have been added together. In this case, the waveform shown in FIG. 8 represents a situation where a signal with a single frequency is being written for the sake of simplicity. On the other hand, when reflected by the optical tape 105, the sub-beam is also modulated by the recorded mark 70 that has been formed by the main beam. However, relatively little modulation component of the recorded mark 70 is included in the reflected light of the sub-beam.

The respective outputs of all channels of the main photo-diode 10 are added together by an adder amplifier 12, which outputs the main beam signal Sm. In the main beam signal Sm, both a write modulated component and a recorded mark signal component are mixed together. The main beam signal Sm is then supplied to an ordinary read circuit 132. As for a sub-beam, a sub-beam signal Ss is also generated by mixing together both a write modulated component and a recorded mark signal component. However, the sub-photodiode receives light from an area including little signal component representing the recorded mark 70. That is why even if the gain is controlled so that the write modulated component of the sub-beam signal Ss has a similar waveform to the write modulated component of the main beam signal Sm, the recorded mark signal component of the sub-beam signal Ss further decreases.

After the gain of a VV amplifier 13 has been controlled so that the write modulated component of the sub-beam signal Ss becomes almost the same level as that of the main beam signal Sm, the difference between the main beam signal Sm and the sub-beam signal Ss is calculated by a differential amplifier 14. As a result, a recorded mark signal can be extracted. As the influence of the variation in the output of the light source 1 remains, an AGC circuit 15 performs auto-gain control (AGC) processing using either the main beam signal Sm or the sub-beam signal Ss, thereby obtaining a waveform corresponding to the original recorded mark signal as a DRAW signal.

In the example illustrated in FIG. 5, the main spot 50 and the sub-spot 51 are supposed to be arranged on the same track. However, as the sub-beam signal Ss is not easily affected by the recorded mark 70 according to this configuration, the sub-spot 51 does not always have to be arranged on the same track as the main spot 50. That is why the diffractive element 2 does not have to be positioned so precisely.

Figure 9:
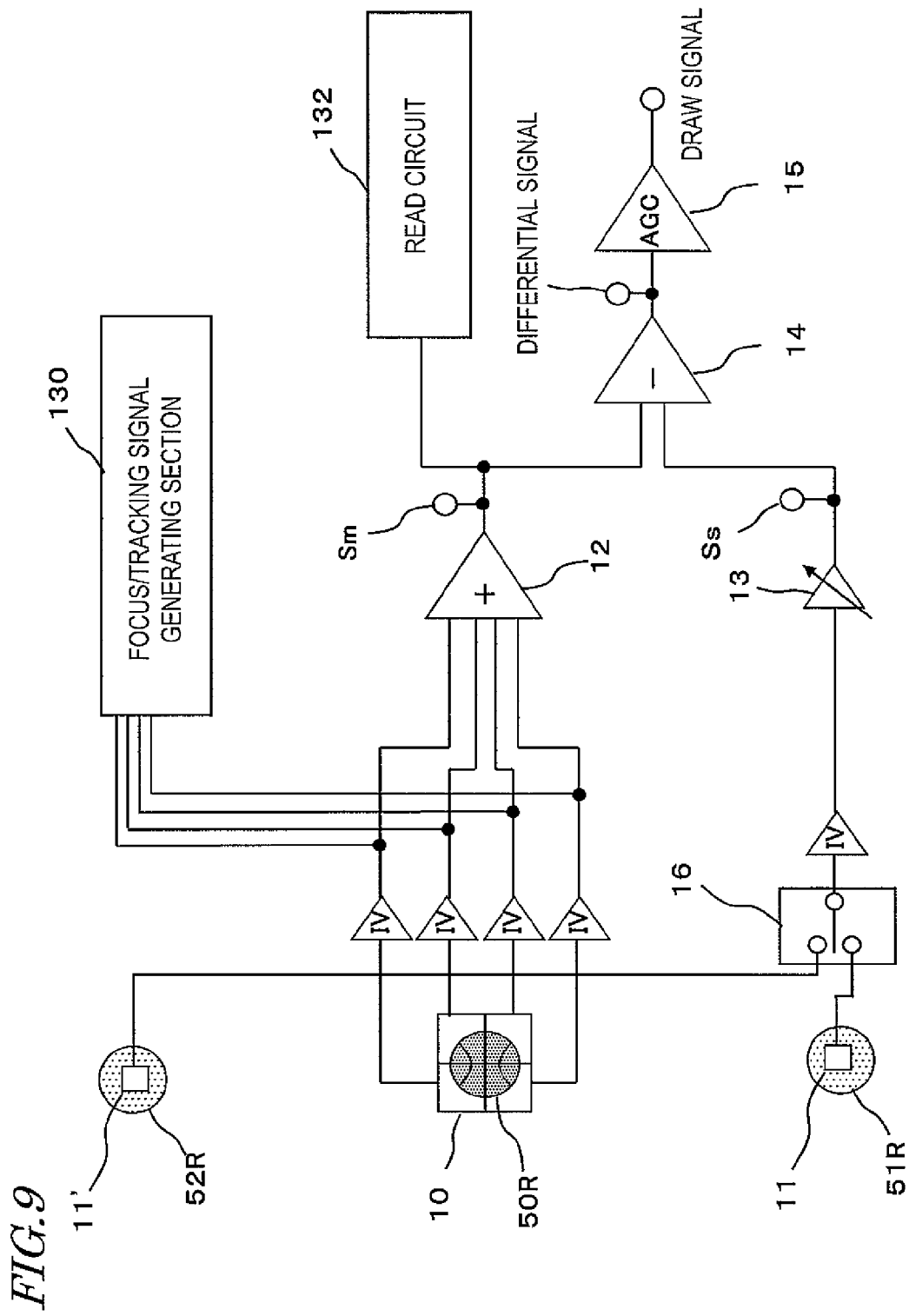
FIG. 9 illustrates another exemplary configuration for detecting a signal according to the first embodiment of the present disclosure.

In one embodiment, another sub-photodiode 11' may be added as shown in FIG. 9 so as to receive both of ±first-order sub-beams. The sub-photodiode 11' has the same shape and the same size as the sub-photodiode 11. This sub-photodiode 11' is arranged to receive not all, but only a part, of the reflected light that has left the sub-spot 52R. In this example, by arranging the photodiode 11' that is smaller than the sub-spot 52R around the center of the sub-spot 52R, a beam including relatively little signal component representing the recorded mark 70 can also be obtained.

Depending on the degree of influence of the light intensity distribution of the light source 1 and the arrangement error of the optical system, the quality of the ±first-order sub-spot may or may not have a significant difference. That is why if this apparatus is configured to compare the sub-beam signals Ss obtained from the respective photodiodes 11 and 11' to each other and choose one of those two signals with which a better DRAW signal would be obtained, then the reliability of the DRAW operation can be further increased.

In the example illustrated in FIG. 9, a selector switch 16 is arranged in order to selectively pass one of the outputs of the two sub-photodiode 11 and 11' to the input terminal of the IV amplifier. Alternatively, an IV amplifier may be provided for each of those sub-photodiodes 11 and 11' and a switch 16 may be arranged before the VV amplifier 13. Still alternatively, IV and VV amplifiers may be provided for the sub-photodiodes 11 and 11', respectively, and a switch 16 may be arranged before the input terminals of the differential amplifier 14. By adopting such a configuration, the sub-beams can be changed with each other when the direction of scanning the optical tape 105 with a light spot reverses. Since each of the sub-spots of the ±first-order light beams is located in either a recorded area or an unrecorded area with respect to the main spot currently on the tape for recording, one of the two sub-spots that will get the DRAW operation done more accurately may be chosen according to the scanning direction.

Figure 10:
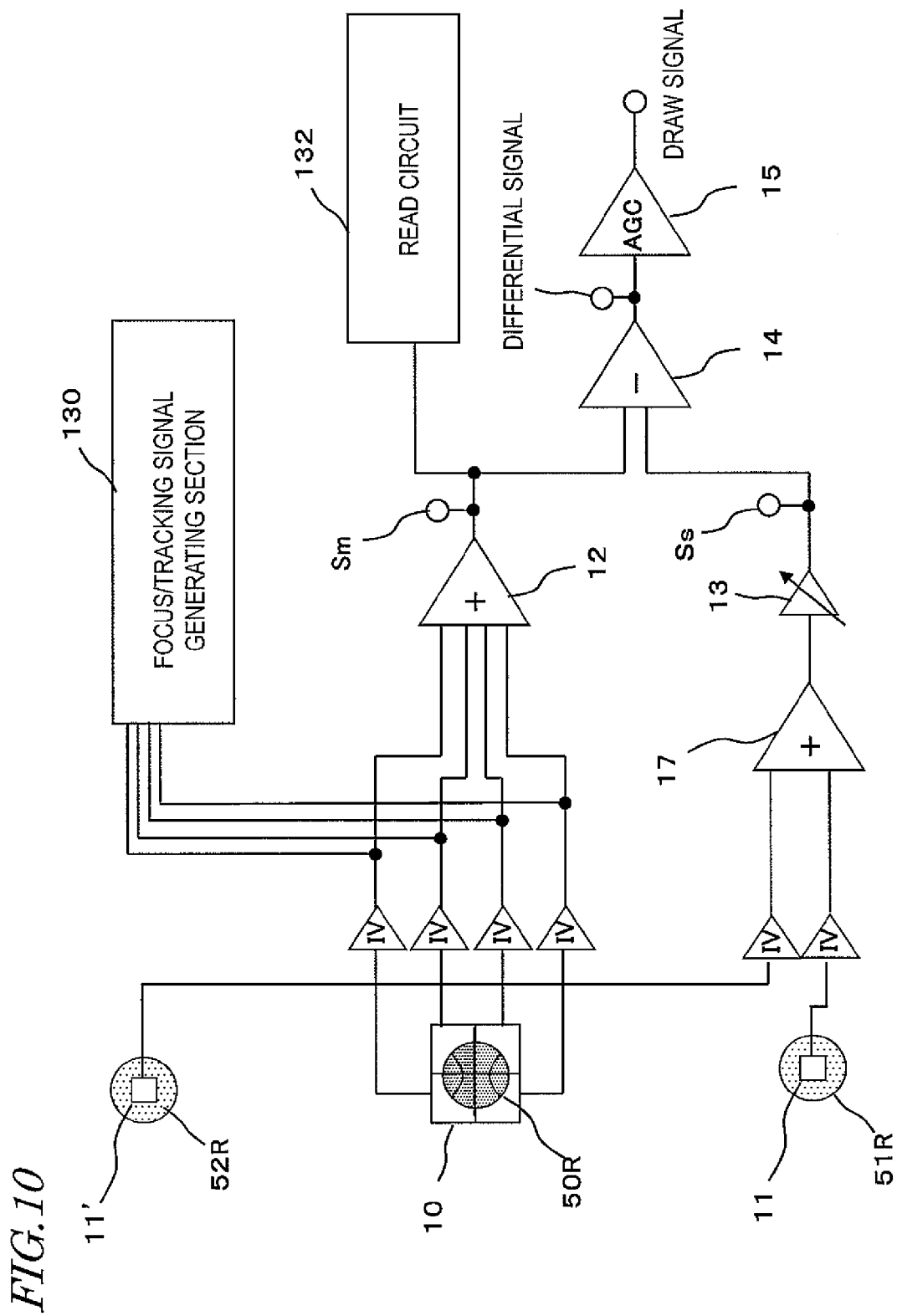
FIG. 10 illustrates still another exemplary configuration for detecting a signal according to the first embodiment of the present disclosure.

Still alternatively, a signal that has been obtained by adding together the respective output signals of the sub-photodiodes 11 and 11' may have its amplitude adjusted with a VV amplifier and then may be input, along with the main beam signal Sm, to the differential amplifier as shown in FIG. 10.

Still alternatively, each of the sub-photodiodes 11 and 11' may be divided into multiple areas so as to obtain a push-pull signal when the sub-spot crosses a track. And that push-pull signal and a main spot's push-pull signal to be obtained from the main photodiode 10 may be input to the differential amplifier, thereby generating a differential push-pull (DPP) signal. In this manner, a tracking error signal, which would hardly cause offset even if lens shift occurred while the objective lens 5 is following the track, can be obtained.

Figure 11:
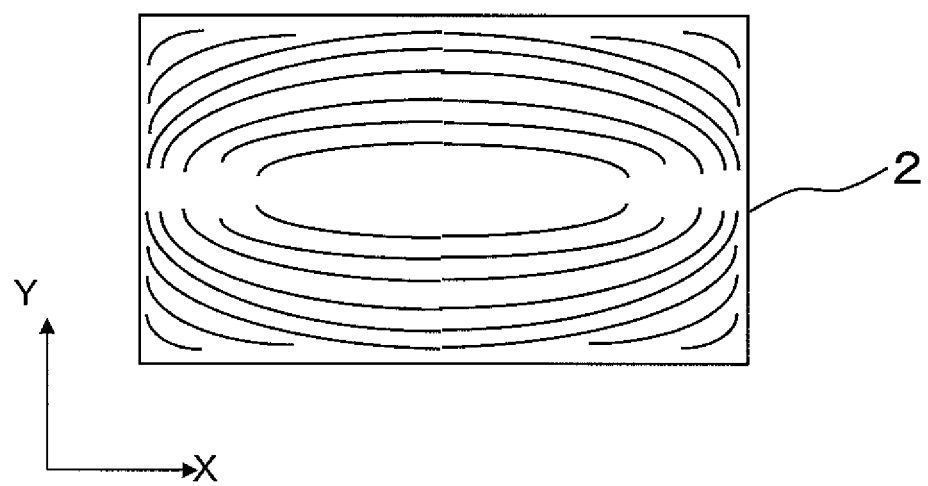
FIG. 11 illustrates an exemplary configuration for a diffractive element according to the first embodiment of the present disclosure.
Figure 12:
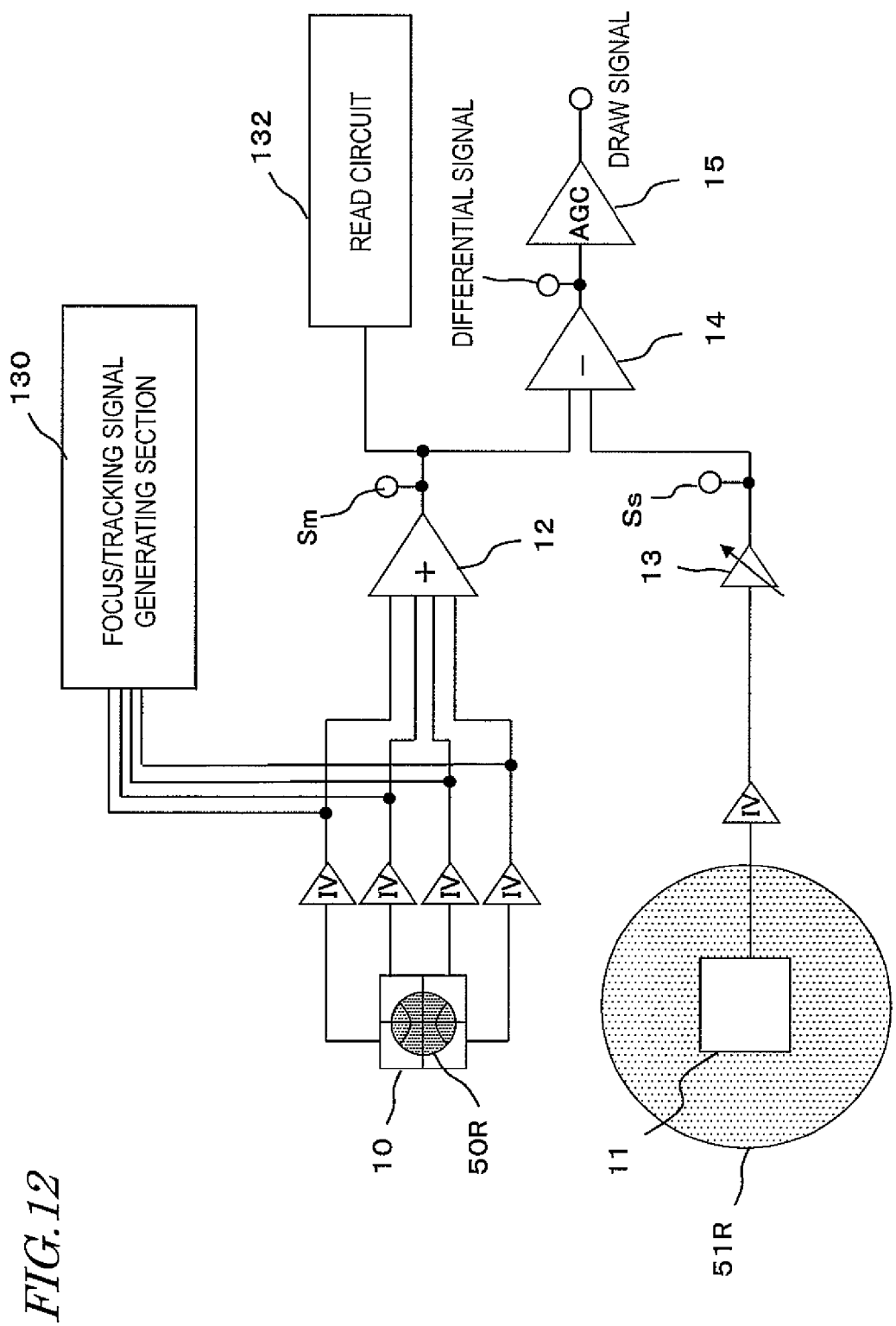
FIG. 12 illustrates yet another exemplary configuration for detecting a signal according to the first embodiment of the present disclosure.

Optionally, the diffracted light may be given aberration by distributing the grating vector directions of the diffractive element 2 as shown in FIG. 11. In that case, the ±first-order light that has been diffracted comes to have an aberration such as a spherical aberration or astigmatism due to the distribution of grating vectors, and therefore, the sub-spot 51 becomes narrowest either before or beyond the optical storage medium (i.e., the optical tape 105 in this embodiment) when the main spot 50 is condensed on the optical tape 105. As a result, a somewhat broadened condensed light beam spot is formed on the optical tape 105 in that case. Consequently, the sub-spot 51R that is formed on the photodetector 8 by the reflected light of the sub-beam 51 while a write operation is being performed with the main spot 50 becomes broader than the main spot 50R as shown in FIG. 12. The sub-photodiode 11 has its size and shape defined so as to receive a portion of this broadened sub-spot 51R representing light with little recorded mark component. By decreasing the degree of condensation of the sub-spot on the optical tape 105, the influence of the recorded mark component on the reflected light of the sub-beam can be reduced.

In the foregoing description, an exemplary configuration that uses a diffractive element as a light-splitting element for generating sub-beams has been described. However, the diffractive element may be replaced with a tapered mirror or a prism, for example. In that case, either surface reflected light or transmitted light may be used as a main beam and the light that has been reflected from the inner surface with a taper angle may be used as a sub-beam.

Embodiment 2

Next, an optical pickup as a second embodiment of the present disclosure will be described.

The basic arrangement of this embodiment is the same as what is illustrated in FIG. 4. Thus, in the following description of this second embodiment, FIG. 4 will be referred to again as needed.

Figure 13A:
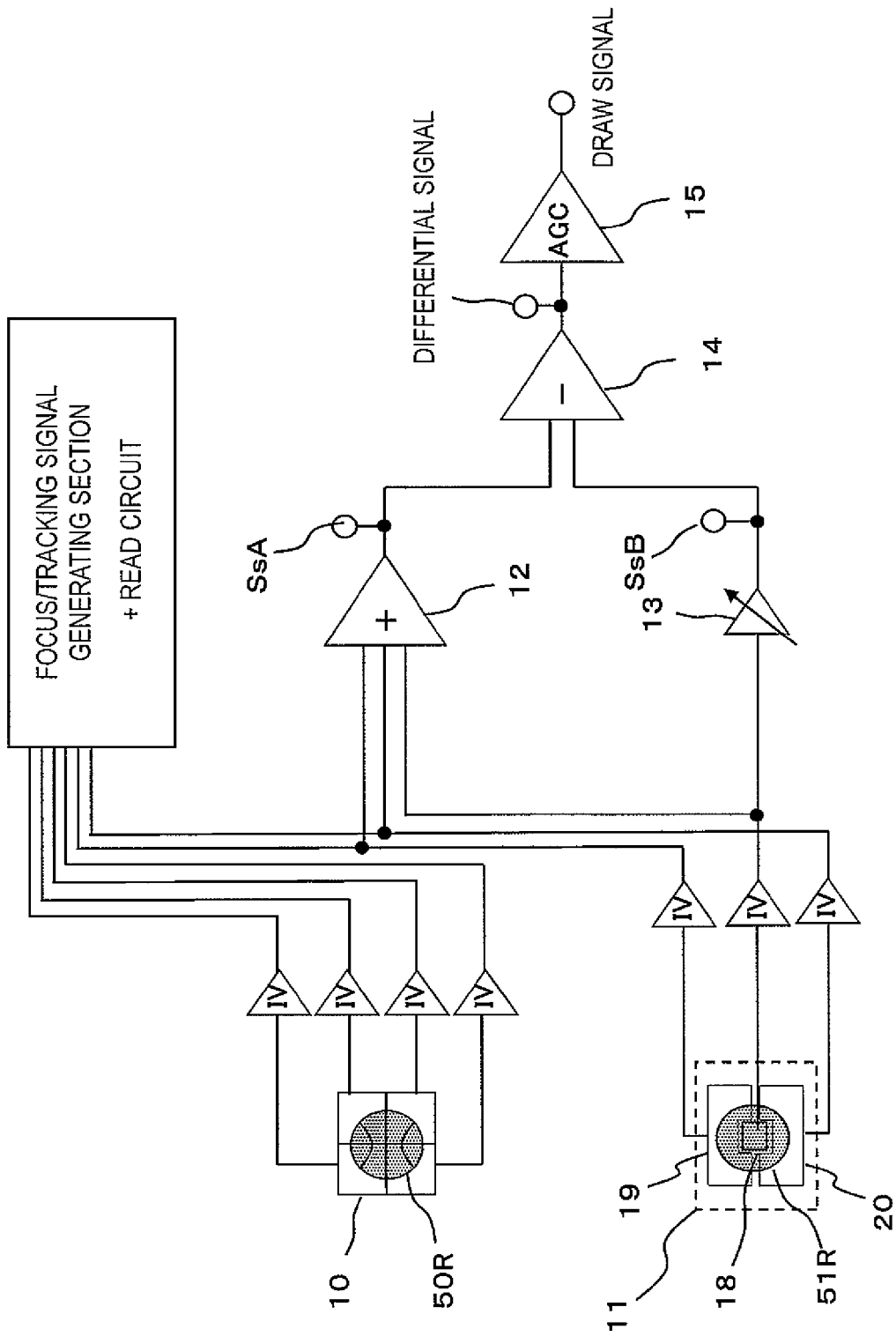
FIG. 13A illustrates an exemplary configuration for detecting a signal according to a second embodiment of the present disclosure.
Figure 13B:
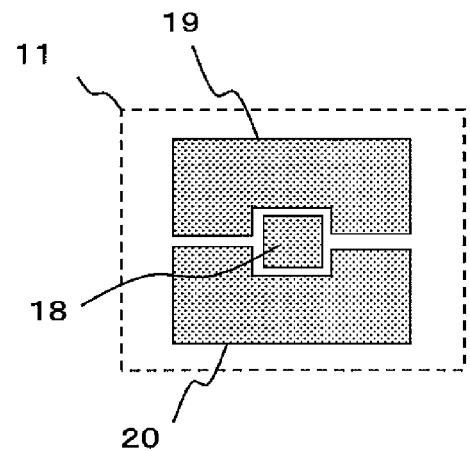
FIG. 13B illustrates an exemplary configuration for a sub-photodiode.

FIG. 13A illustrates a configuration for the photodiodes of the photodetector 8 of this embodiment and also is a block diagram of a circuit that carries out signal processing using its section from the photodetector 8 through the arithmetic circuit 9. FIG. 13B is an enlarged view of the sub-photodiode 11. Of the two sub-spots 51 and 52 of the ±first-order light beams shown in FIG. 5, what is received by the sub-photodiode 11 is the reflected light that has left the sub-spot 51 illustrated as the upper one on the paper. That is to say, the sub-beam received by the sub-photodiode 11 is the light that has left the sub-spot 51 on the mark 70 that has just been recorded with the main spot 50. In this configuration, the sub-spot 51 and the main spot 50 had better be arranged side by side on the same track. In principle, however, the sub-spot 51 may also be located on the previous track on which a mark has been recorded with the main spot 50 (i.e., the area on the left-hand side in FIG. 5), not the track on which a mark is going to be recorded from now.

Figure 13C:
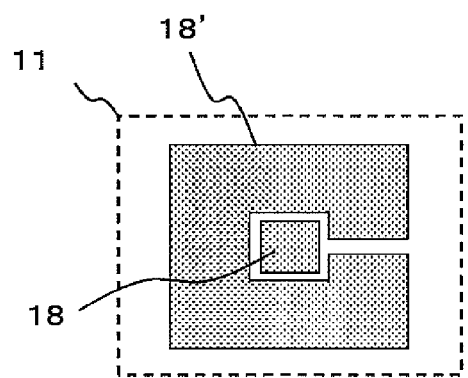
FIG. 13C illustrates another exemplary configuration for a sub-photodiode.
Figure 13D:
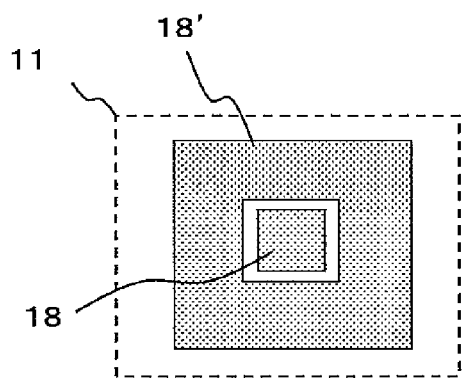
FIG. 13D illustrates still another exemplary configuration for a sub-photodiode.

As shown in FIG. 13B, the sub-photodiode 11 has been divided into a plurality of areas 18, 19 and 20. The first area 18 is located at a position where a portion of the sub-beam with little recorded mark signal component is incident (e.g., at the center portion of the sub-photodiode 11). In this example, a signal obtained from the first area 18 will be referred to herein as a "sub-beam signal SsB". On the other hand, the second and third areas 19 and 20 are arranged outside of the first area 18 and the rest of the sub-beam other than the center portion is incident on the second and third areas 19 and 20. The first area 18 is electrically connected to an IV amplifier through the gaps left between the second and third areas 19 and 20. If any of those gaps between the second and third areas 19 and 20 cannot pass a line, the second and third areas 19 and 20 may be connected together at such a gap. In that case, the sub-photodiode 11 will be divided into only two areas. 18 and 18' as shown in FIG. 13C. Furthermore, if a backside illumination type photodetector 8 is used, then the lines may be arranged on a different side from the light incident surface. Then, as there is no need to separate the second and third areas 19 and 20 from each other, the sub-photodiode 11 may be divided into an inner area 18 and an outer area 18' as shown in FIG. 13D. It should be noted that those areas 18, 19, 20 and 18' do not have to have the illustrated shapes but may also have shapes with curved contours. Furthermore, the number of areas that form the sub-photodiode 11 does not have to be three or less, but may also be four or more.

Figure 14:
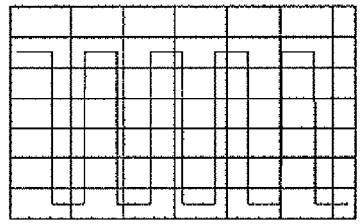
FIG. 14 is a schematic representation illustrating how to perform signal processing according to the second embodiment of the present disclosure.
Figure 14:
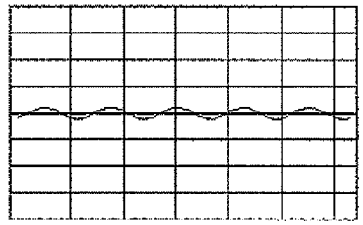
Figure 14:
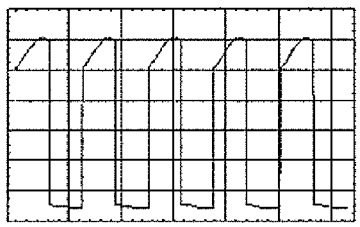
Figure 14:
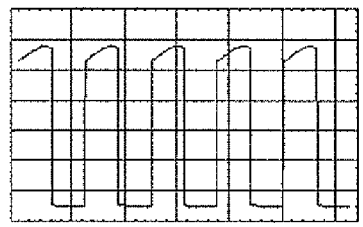
Figure 14:
Figure 14:
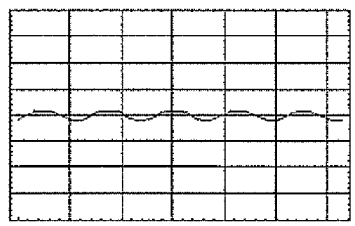

As a signal with the recorded mark signal component, a signal obtained by adding together the respective light quantities of all sub-beams may be used. In this description, such a sum signal will be referred to herein as a "sub-beam signal SsA". In the example illustrated in FIG. 13A, the sum of three signals obtained from the first, second and third areas 18, 19 and 20 becomes the sub-beam signal SsA. By calculating the difference between those sub-beam signals SsA and SsB using the differential amplifier 14 and subjecting the differential signal to the AGC processing, a DRAW signal can be obtained. FIG. 14 schematically shows the waveforms of signals at respective points in this configuration.

In this configuration, the DRAW signal is generated by only the photodiode 11 that detects the sub-spot 51R. That is why this technique has an advantage over the technique for extracting a recorded mark signal component using the photodiode 10 that detects the main spot 50 currently formed on the tape for writing. This is because according to this technique, the DRAW signal can be generated based on a complete recorded mark signal after a mark has been recorded fully, not an incomplete recorded mark signal while a mark is still being recorded. In addition, since the DRAW signal can be generated based on a single sub-beam, there is much less optical or electrical difference than in a situation where the main beam signal Sm or a sub-beam signal representing the other diffracted light is used. On top of that, since the sub-beam signals SaA and SsB are almost equally affected by the optical modulation component during writing and the reflectance variation caused by the old mark on which a new mark is being overwritten, a recorded mark signal can be extracted with good stability right after the write operation has gotten done with the main spot by using the DRAW signal that has been obtained by performing a differential arithmetic operation on the sub-beam signals SsA and SsB in this configuration.

Optionally, the push-pull signal obtained from the second or third area 19 or 20 and a main spot's push-pull signal to be obtained from the main photodiode 10 may be input to the differential amplifier, thereby generating a differential push-pull (DPP) signal. In this manner, tracking error signal, which would hardly cause offset even if lens shift occurred while the objective lens 5 is following the track, can be obtained.

Figure 15:
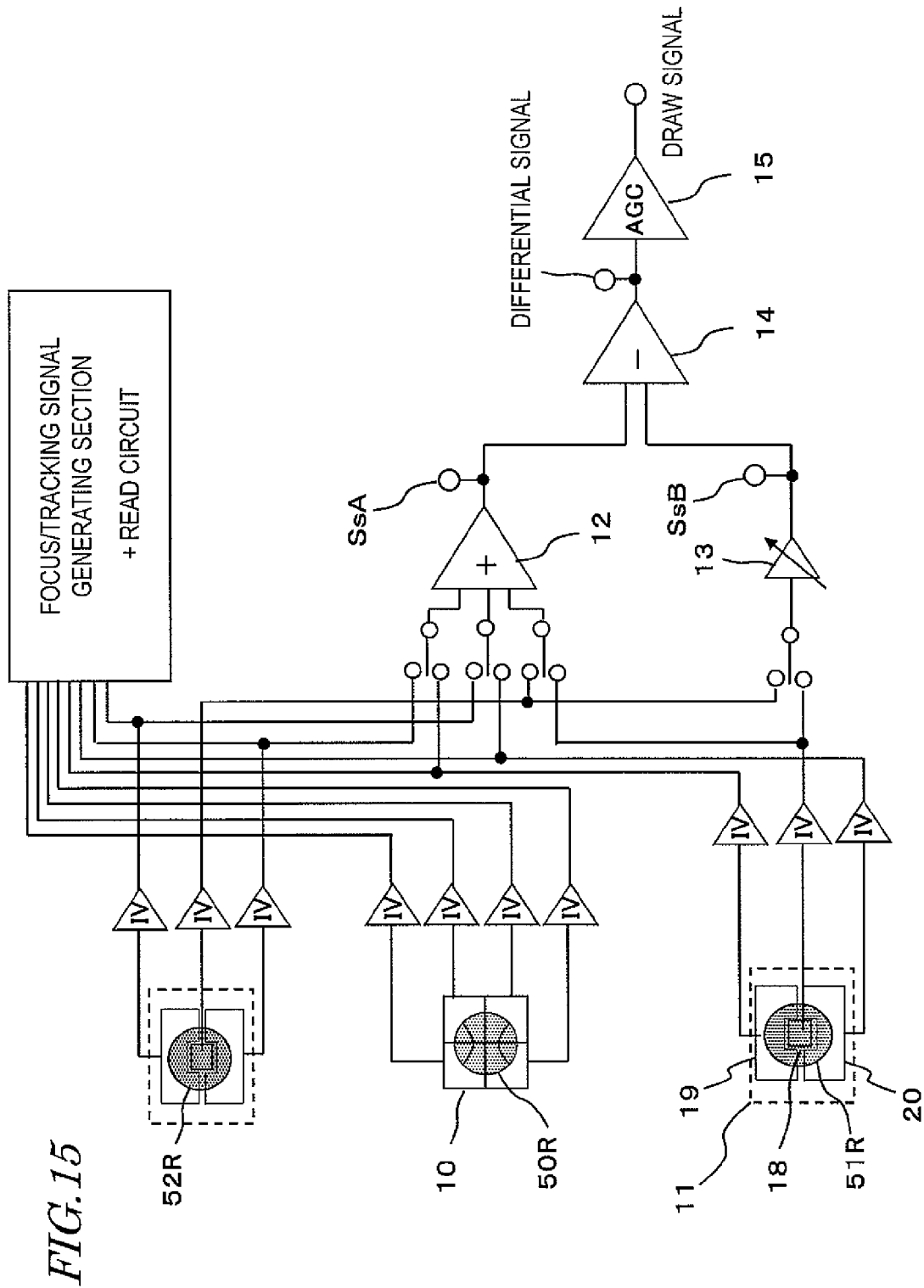
FIG. 15 illustrates another exemplary configuration for detecting a signal according to the second embodiment of the present disclosure.

Still alternatively, a photodiode that receives the other sub-beam and its associated amplifier and switch may be added as shown in FIG. 15. By adopting such a configuration, the sub-beams can be changed with each other so that the DRAW signal can be generated even when the direction of scanning the storage medium with a light spot reverses.

In the foregoing description of the second embodiment, an exemplary configuration that uses a diffractive element as a light-splitting element for generating sub-beams has been described. However, the diffractive element may be replaced with a tapered mirror or a prism, for example. In that case, either surface reflected light or transmitted light may be used as a main beam and the light that has been reflected from the inner surface with a taper angle may be used as a sub-beam.

Embodiment 3

Hereinafter, an optical pickup as a third embodiment of the present disclosure will be described.

Figure 16:
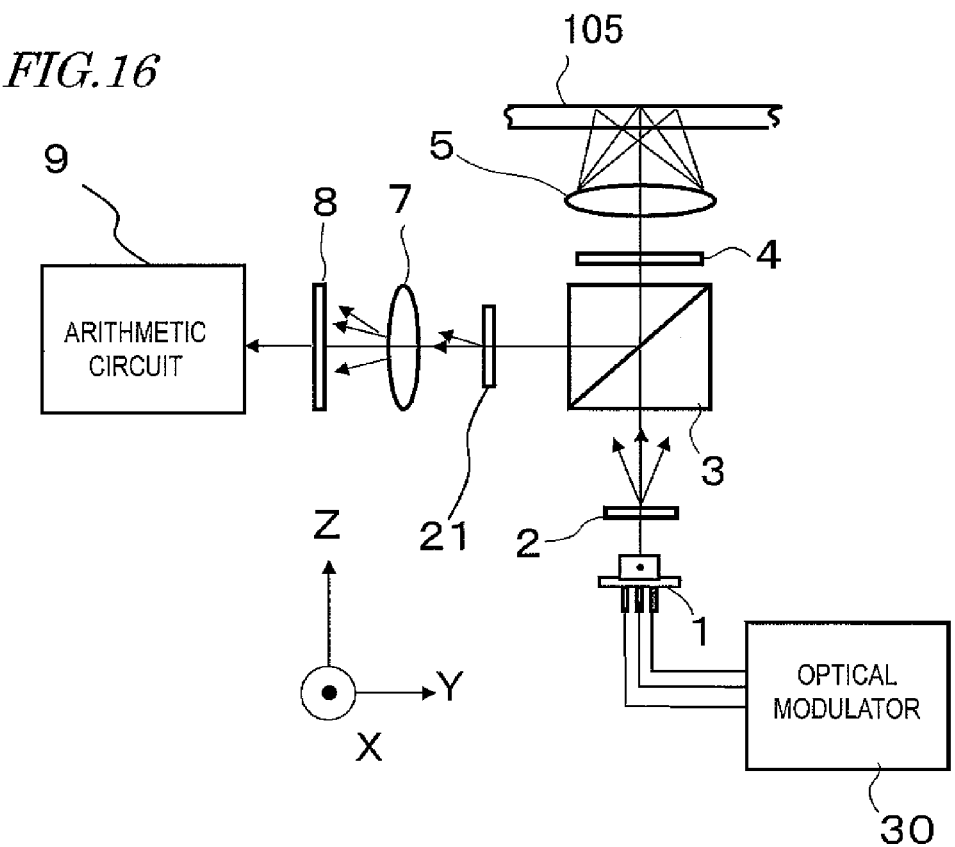
FIG. 16 illustrates an arrangement of an optical pickup according to a third embodiment of the present disclosure.

FIG. 16 illustrates the arrangement of an optical system for the optical pickup of this embodiment.

Figure 17:
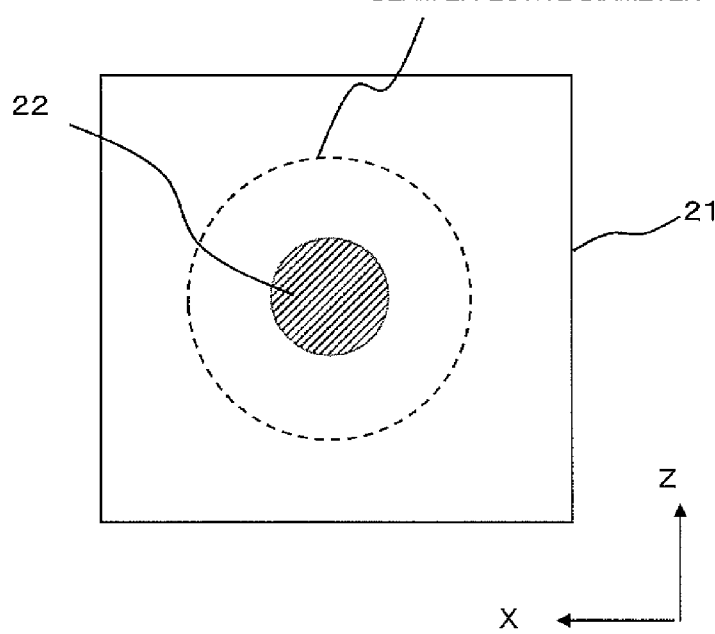
FIG. 17 illustrates an exemplary configuration for an optical extractor according to the third embodiment of the present disclosure.

In this embodiment, an optical extractor 21 is arranged between the polarization beam splitter 3 and the photodetector 8. In the example to be described below, a diffractive element that acts on only a part of the beam as shown in FIG. 17 is supposed to be used as the optical extractor 21. In the optical extractor 21 of this example, the central portion of the beam effective diameter is a diffraction grating 22, of which the grating vector points a 45 degree direction obliquely.

The light that has been reflected from the optical tape 105 and then incident on the optical extractor 21 gets diffracted by this diffraction grating 22, transmitted through the detector lens 7, and then is incident on a photodetector.

Figure 18:
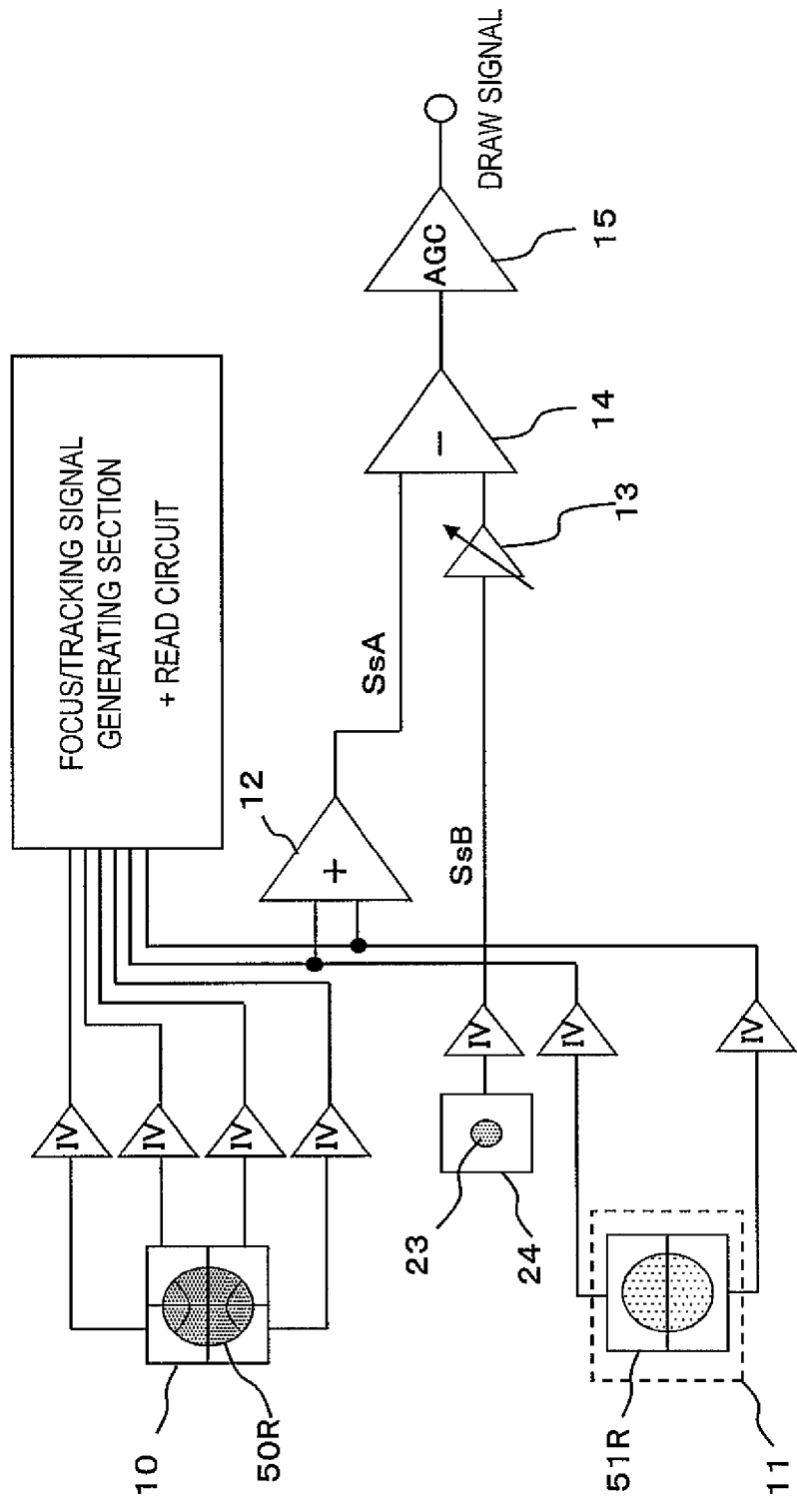
FIG. 18 illustrates an exemplary configuration for detecting a signal according to the third embodiment of the present disclosure.

FIG. 18 illustrates a configuration for the photodiodes of the photodetector of this embodiment and also is a block diagram of a circuit that carries out signal processing using its section from the photodetector 8 through the arithmetic circuit 9. The sub-beam that has not been diffracted by the diffraction grating 22 is received at the sub-photodiode 11, and then used, along with the main beam that has been received at the main photodiode 10, to generate tracking and focus control signals. The sub-beam is also used as a sub-beam signal SsA including a recorded mark signal component.

On the other hand, the light 23 that has been diffracted by the diffraction grating 22 is incident on the photodiode 24. The light 23 is set to be received at an area with little recorded mark signal component and is used as a sub-beam signal SsB. And by performing a differential arithmetic operation on those sub-beam signals SsA and SsB using the differential amplifier 14 and subjecting the differential signal to the AGC processing, a DRAW signal can be obtained. In this configuration, the DRAW signal is also generated based on only a signal representing the sub-spot. That is why this technique has an advantage over the technique for extracting a recorded mark signal component from the signal representing the main spot 50 currently formed on the tape for writing. This is because according to this technique, the DRAW signal can be generated based on a complete recorded mark signal after a mark has been recorded fully, not an incomplete recorded mark signal while a mark is still being recorded. In addition, since the DRAW signal can be generated based on a single sub-beam, there is much less optical or electrical difference than in a situation where the main beam signal Sm or a sub-beam signal representing the other diffracted light is used. On top of that, since the sub-beam signals SsA and SsB are almost equally affected by the optical modulation component during writing and the reflectance variation caused by the old mark on which a new mark is being overwritten, a recorded mark signal can be extracted with good stability right after the write operation has gotten done with the main spot by using the DRAW signal that has been obtained by performing a differential arithmetic operation on the sub-beam signals SsA and SsB in this configuration.

In addition, according to this embodiment, the sub-beam is divided and allocated to respective areas not on the photo-diode but on an optical path, on which the beam yet to be condensed still has a relatively large beam diameter, in order to generate the DRAW signal. As a result, the area division and allocation, and positioning the optical extractor 21 and the photodetector in this case, can get done easily, which is advantageous.

Figure 19:
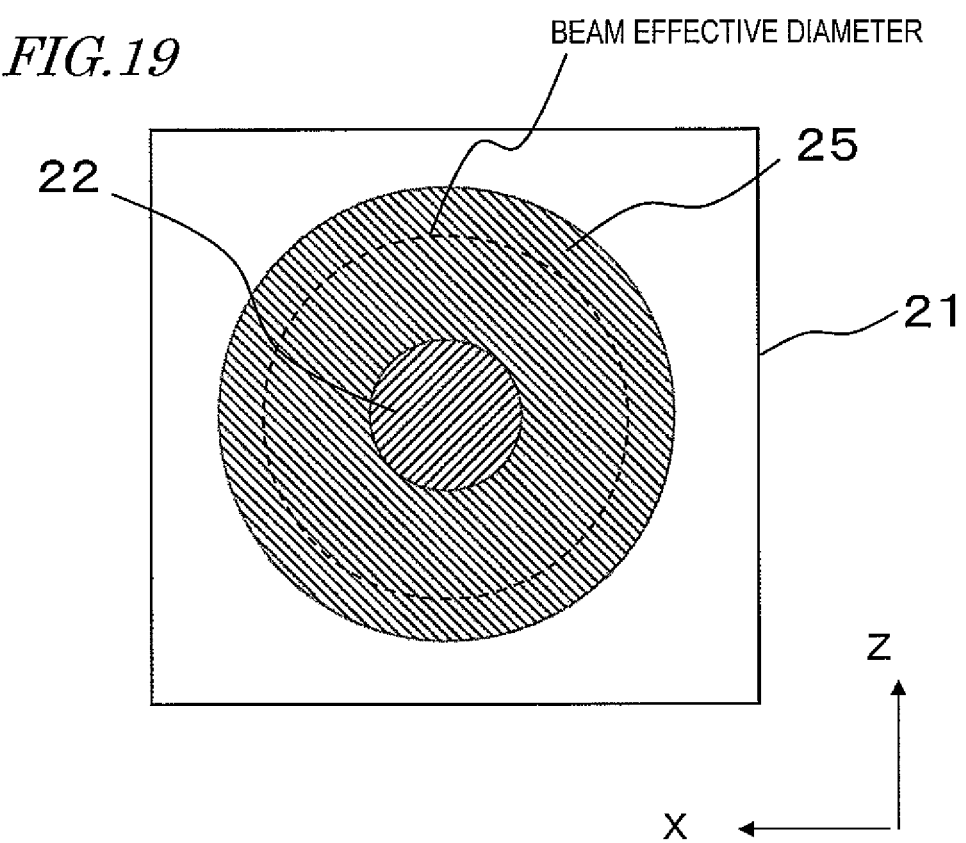
FIG. 19 illustrates another exemplary configuration for an optical extractor according to the third embodiment of the present disclosure.

Optionally, as the optical extractor 21, a diffractive element in which multiple grating vectors are defined in multiple areas as shown in FIG. 19 may also be used. In this example, the optical extractor 21 has its central portion defined as a diffraction grating 22 with a grating vector that points an oblique 45 degree direction and also has the other portion thereof defined as a diffraction grating 25 with a grating vector, of which the direction intersects with that of the central portion at right angles.

Figure 20:
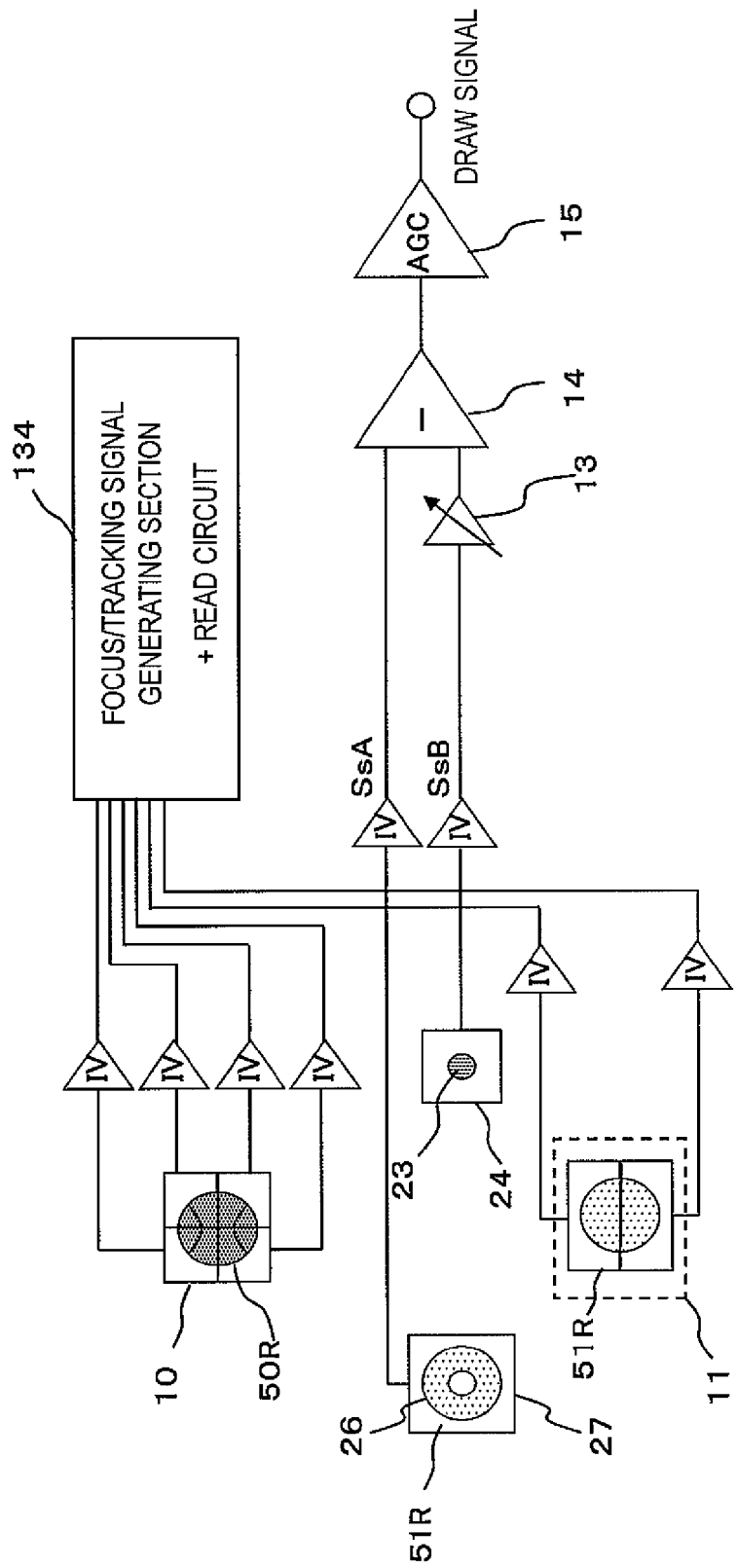
FIG. 20 illustrates another exemplary configuration for detecting a signal according to the third embodiment of the present disclosure.
Figure 21A:
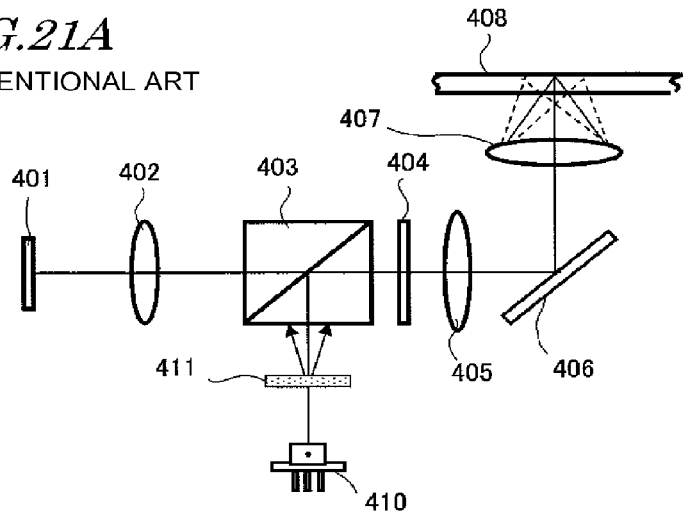
FIG. 21A illustrates an arrangement of an optical pickup for a known optical read/write apparatus.
Figure 21B:
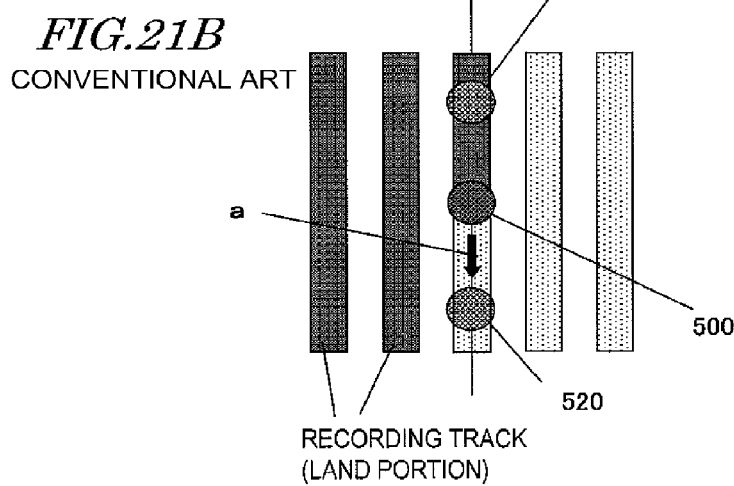
FIG. 21B illustrates how the known optical read/write apparatus forms spots on an optical storage medium.
Figure 21C:
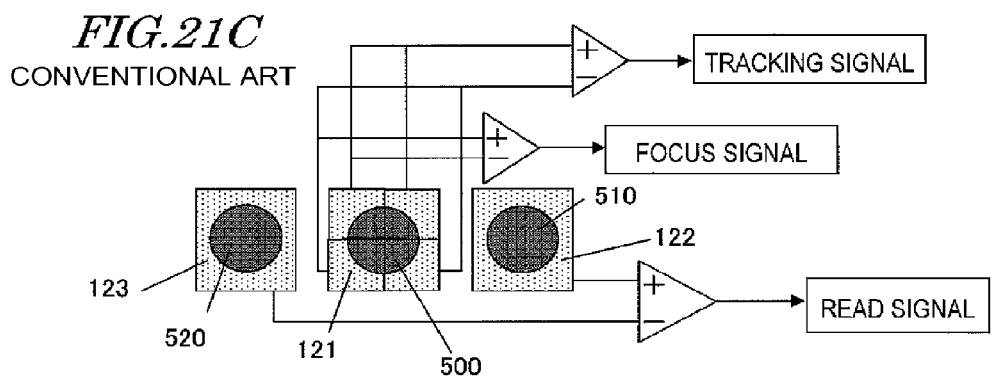
FIG. 21C illustrates a configuration for signal detectors in the known optical read/write apparatus.

FIG. 20 illustrates a configuration for the photodiodes of the photodetector 8 that can be used in this embodiment and also is a block diagram of a circuit that carries out signal processing using its section from the photodetector 8 through the arithmetic circuit 9. The light that has been diffracted by the diffraction grating 25 is incident on the photodiode 27. The light that has been incident on that area includes a recorded mark signal component. That is why by using the output of the photodiode 27 as a sub-beam signal SsA, the difference between the sub-beam signals SsA and SsB is calculated and then subjected to AGC processing, thereby obtaining a DRAW signal.

Of the two sub-spots of the ±first-order light beams shown in FIG. 5, what is received by the sub-photodiode 11 of this embodiment is the reflected light that has left the sub-spot 51 illustrated as the upper one on paper. That is to say, the sub-beam received by the sub-photodiode 11 is the light that has left the sub-spot 51 on the mark 70 that has just been recorded with the main spot 50. In this configuration, the sub-spot 51 and the main spot 50 had better be arranged side by side on the same track. In principle, however, the sub-spot 51 may also be located on the previous track on which a mark has been recorded with the main spot 50 (i.e., the area on the left-hand side in FIG. 5), not the track on which a mark is going to be recorded from now.

Optionally, the push-pull signal obtained from the sub-photodiode 11 and a main spot's push-pull signal to be obtained from the main photodiode 10 may be input to the differential amplifier, thereby generating a differential push-pull (DPP) signal. In that case, a tracking error signal, which would hardly cause offset even if lens shift occurred while the objective lens 5 is following the track, can be obtained.

Still alternatively, a photodiode that receives the other sub-beam and its associated amplifier and switch may be added. By adopting such a configuration, the sub-beams can be changed with each other so that the DRAW signal can be generated even when the direction of scanning the storage medium with a light spot reverses.

In the example illustrated in FIG. 16, the optical extractor 21 is arranged between the polarization beam splitter 3 and the detector lens 7. However, the optical extractor 21 may also be arranged between the detector lens 7 and the photodetector 8, between the objective lens 5 and the polarization beam splitter 3, or at any other appropriate position.

In the third embodiment described above, the diffractive element 2 is supposed to be used as a light-splitting element for generating sub-beams. However, to generate a single sub-beam, a tapered mirror or a prism may also be used instead of the diffractive element 2. In that case, either surface reflected light or transmitted light may be used as a main beam and the light that has been reflected from the inner surface with a taper angle may be used as a sub-beam.

According to embodiments of the present disclosure described above, sub-spots need to be aligned much less strictly with respect to a spot for writing, and therefore, the optical pickup can either have a simplified configuration or be assembled far more easily.

In addition, according to embodiments of the present disclosure described above, an optical pickup that can perform a DRAW operation using a good read signal with no optical modulation components produced by the light source even when an overwrite operation is performed on a recorded optical storage medium can be provided with its configuration simplified.

Moreover, according to embodiments of the present disclosure described above, even if the given optical storage medium changes its running direction, appropriate processing can be done quickly by switching the photodetector.

On top of that, according to embodiments of the present disclosure described above, a DC offset free tracking signal can be obtained with good stability by using a main spot for writing and sub-spots for reading, thus improving the quality of storage on optical media, too.

While the present disclosure has been described with respect to embodiments thereof, it will be apparent to those skilled in the art that the disclosed disclosure may be modified, in numerous ways and may assume many embodiments other than those specifically described above. Accordingly, it is intended by the appended claims to cover all modifications of the invention that fall within the true spirit and scope of the invention.

Various embodiments of the present disclosure described above are applicable to a system for storing a huge size of data using multiple optical pickups (such as a data file system that uses an optical tape or an optical disc).

This application is based on Japanese Patent Applications No. 2011-206939 filed Sep. 22, 2011 and No. 2012-085501 filed Apr. 4, 2012, the entire contents of which are hereby incorporated by reference.

What is claimed is:

1. An optical pickup comprising:
  a light source;
  an optical system which forms multiple light beams based on the light that has been emitted from the light source and which converges a write beam and a read beam, included in the multiple light beams, thereby forming a main spot and a sub-spot, respectively, on an optical storage medium, the optical system converging the write and read beams onto the optical storage medium so that the main spot moves through the same region on the optical storage medium ahead of the sub-spot; and
  a detector which senses the write and read beams that have been reflected from the optical storage medium and which generates electrical signals,
  wherein the detector includes a first photodiode that receives reflected light that has left the main spot on the optical storage medium and a second photodiode that receives only a portion of the reflected light that has left the sub-spot on the optical storage medium, a signal component representing marks, which have been recorded on the storage medium by the write beam, included in the reflected light received by the first photodiode is larger than that included in the portion of reflected light received by the second photodiode.

2. The optical pickup of claim 1, wherein the second photodiode is arranged so as to receive an appropriately central portion of the reflected light that has left the sub-spot.

3. The optical pickup of claim 1, wherein the optical system converges the write and read beams so that a condensing state of the read beam on the optical storage medium is inferior to that of the write beam on the optical storage medium.

4. The optical pickup of claim 1, wherein the first photodiode has been divided into multiple areas, and
  wherein a main tracking error signal is generated by a push-pull method based on signals obtained from the multiple areas of the first photodiode, and
  wherein a sub-tracking error signal is generated by the push-pull method based on signals obtained from multiple areas of the second photodiode, and
  wherein a tracking error signal is generated based on the main and sub-tracking error signals.

5. An optical read/write apparatus comprising at least one optical pickup of claim 1 and reading and writing data from/on an optical storage medium.

* * * * *